United States Patent
Jordan et al.

(10) Patent No.: US 10,983,244 B2
(45) Date of Patent: Apr. 20, 2021

(54) METHOD FOR SCANNING AN OBJECT USING A GRAVIMETER

(71) Applicant: University of Rochester, Rochester, NY (US)

(72) Inventors: Andrew N. Jordan, Rochester, NY (US); John C. Howell, Rochester, NY (US)

(73) Assignee: University of Rochester, Rochester, NY (US)

( * ) Notice: Subject to any disclaimer, the term of this patent is extended or adjusted under 35 U.S.C. 154(b) by 89 days.

(21) Appl. No.: 16/231,368

(22) Filed: Dec. 21, 2018

(65) Prior Publication Data

US 2019/0196053 A1    Jun. 27, 2019

Related U.S. Application Data

(60) Provisional application No. 62/609,314, filed on Dec. 21, 2017.

(51) Int. Cl.
*G01V 7/12* (2006.01)
*G01V 7/04* (2006.01)
*G01V 7/06* (2006.01)

(52) U.S. Cl.
CPC ............ *G01V 7/12* (2013.01); *G01V 7/04* (2013.01); *G01V 7/06* (2013.01)

(58) Field of Classification Search
CPC .............. G01V 7/04; G01V 7/06; G01V 7/12
USPC ..................................... 73/382 R, 382 G, 383
See application file for complete search history.

(56) References Cited

U.S. PATENT DOCUMENTS

| | | | | |
|---|---|---|---|---|
| 2,137,963 A * | 11/1938 | Heiland | ............ | G01V 7/04 |
| | | | | 73/382 R |
| 3,011,346 A * | 12/1961 | Garvin | ............ | G01V 7/16 |
| | | | | 73/382 R |
| 3,424,006 A * | 1/1969 | Block | ............ | G01V 7/04 |
| | | | | 73/382 R |
| 3,429,184 A * | 2/1969 | Russell | ............ | G01V 7/04 |
| | | | | 73/382 R |
| 3,672,473 A * | 6/1972 | Verhagen | ............ | G01P 15/02 |
| | | | | 188/266 |
| 3,688,584 A * | 9/1972 | Stone | ............ | G01V 7/14 |
| | | | | 73/382 R |
| 3,744,909 A * | 7/1973 | Bruce | ............ | G01V 7/04 |
| | | | | 356/450 |
| 3,926,054 A * | 12/1975 | Buck | ............ | G01V 7/12 |
| | | | | 73/382 R |

(Continued)

OTHER PUBLICATIONS

Brandon M. Anderson et al., "Interferometry with synthetic gauge fields", Physical Review A, American Physical Society, vol. 83, 2011. (Year: 2011).*

(Continued)

*Primary Examiner* — David A. Rogers
(74) *Attorney, Agent, or Firm* — Hodgson Russ LLP

(57) ABSTRACT

Methods of scanning an object using a pendulum gravimeter are disclosed. The pendulum gravimeter may include an interferometer, such as a Sagnac interferometer, to determine a displacement on the pendulum by way of a mirror attached to the pendulum. Scanning of the object may be performed in 1D, 2D, or 3D, and may result in an image of the object. In another aspect, a mass may be tracked while in motion using a pendulum gravimeter to detect the gravitational attraction of the object.

12 Claims, 9 Drawing Sheets

(56) References Cited

U.S. PATENT DOCUMENTS

| | | | | |
|---|---|---|---|---|
| 3,960,344 | A * | 6/1976 | Dugan | G01V 7/16 244/182 |
| 4,333,341 | A * | 6/1982 | Manche | G01V 7/14 73/382 R |
| 4,383,762 | A * | 5/1983 | Burkert | G01J 3/4532 356/455 |
| 4,841,772 | A * | 6/1989 | Paik | G01V 7/00 73/382 G |
| 5,144,150 | A * | 9/1992 | Yoshizumi | G01B 11/007 250/559.4 |
| 5,203,199 | A * | 4/1993 | Henderson | G01P 21/00 73/1.39 |
| 5,204,568 | A * | 4/1993 | Kleinberg | F16C 32/0438 310/90.5 |
| 5,351,122 | A * | 9/1994 | Niebauer | G01P 15/093 356/28.5 |
| 5,892,151 | A * | 4/1999 | Niebauer | G01V 7/14 73/382 R |
| 6,079,267 | A * | 6/2000 | Hull | F16C 32/0438 310/90.5 |
| 6,494,091 | B2 * | 12/2002 | Couture | G01V 7/04 505/843 |
| 6,615,660 | B1 * | 9/2003 | Feinberg | G01V 7/00 73/1.01 |
| 6,671,057 | B2 * | 12/2003 | Orban | G01B 9/02097 356/496 |
| 7,401,514 | B2 * | 7/2008 | Wang | G01V 7/10 73/383 |
| 7,466,396 | B2 * | 12/2008 | Binnard | G03F 7/70775 355/68 |
| 8,141,259 | B2 * | 3/2012 | Donadille | G01V 7/06 33/1 E |
| 8,442,777 | B1 * | 5/2013 | Mekid | G01N 3/56 702/33 |
| 8,661,894 | B2 * | 3/2014 | Beverini | G01V 7/005 73/382 R |
| 9,291,742 | B2 * | 3/2016 | Niebauer | G01V 7/12 |
| 9,507,048 | B2 * | 11/2016 | Rohner | G01V 7/12 |
| 9,939,551 | B2 * | 4/2018 | Levitt | G01V 7/00 |
| 9,952,154 | B2 * | 4/2018 | Sinclair | G01N 21/645 |
| 10,591,632 | B2 | 3/2020 | Howell et al. | |
| 2002/0152810 | A1 * | 10/2002 | Couture | G01V 7/04 73/382 R |
| 2003/0136190 | A1 * | 7/2003 | Araya | G01P 3/36 73/382 R |
| 2011/0303005 | A1 * | 12/2011 | Donadille | G01V 7/06 73/382 R |
| 2015/0234088 | A1 * | 8/2015 | Rohner | G01V 7/12 248/610 |
| 2017/0371065 | A1 * | 12/2017 | Guzman | G01P 15/093 |

OTHER PUBLICATIONS

Stefan L. Danilishin et al., "Advanced quantum techniques for future gravitational-wave detectors", Living Reviews in Relativity, vol. 22, Issue 1, Dec. 2019. (Year: 2019).*

Andrew N. Jordan et al., "Gravitational sensing with weak value based optical sensors", Quantum Studies: Mathematics and Foundations, vol. 6, Nov. 17, 2018. (Year: 2018).*

Zhou Min-Kang et al., "Micro-Gal level gravity measurements with cold atom interferometry", Chinese Physics B, vol. 24, No. 5, Mar. 27, 2015. (Year: 2015).*

Harold V. Parks et al., "A simple pendulum laser interferometer for determining the gravitational constant", Philosophical Transactions of the Royal Society A, vol. 372, 2014. (Year: 2014).*

Matthew Pitkin et al., "Gravitational Wave Detection by Interferometry (Ground and Space)", Living Reviews in Relativity, vol. 14, Issue 1, Dec. 2011. (Year: 2011).*

Tomofumi Shimoda et al., "Seismic Cross-coupling Noise in Torsion Pendulums", Physical Review D, American Physical Society, vol. 97, Issue 10, May 3, 2018. (Year: 2018).*

Roger Miller et al., Airborne Gravity Gradiometry and Magnetics in the Search for Economic Iron Ore Deposits, Proceedings from Iron Ore 2011. (Year: 2011).*

Viza, G.I. et al., Experimentally quantifying the advantages of weak-value-based metrology, Phys. Rev. A., Sep. 22, 2015, vol. 92, No. 3, pp. 1-11.

Dixon, P.B. et al., Ultrasensitive Beam Deflection Measurement via Interferometric Weak Value Amplification, Phys. Rev. Lett., Apr. 27, 2009, vol. 102, No. 17, pp. 1-5.

Schlamminger, S. et al., Test of the Equivalence Principle Using a Rotating Torsion Balance, Phys. Rev. Lett., Jan. 28, 2008, vol. 100, No. 4, pp. 1-4.

Dransfield, M., Airborne Gravity Gradiometry in the Search for Mineral Deposits, Advances in Airborne Geophysics, Jan. 2007, pp. 341-354.

* cited by examiner

METHOD FOR SCANNING AN OBJECT USING A GRAVIMETER

CROSS-REFERENCE TO RELATED APPLICATIONS

This application claims priority to U.S. Provisional Application No. 62/609,314, filed on Dec. 21, 2017, now pending, the disclosure of which is incorporated herein by reference.

STATEMENT REGARDING FEDERALLY SPONSORED RESEARCH

This invention was made with government support under contract no. W911NF-15-0296 awarded by the ARMY Research Office. The government has certain rights in the invention.

FIELD OF THE DISCLOSURE

The present disclosure relates to measuring gravitational attraction.

BACKGROUND OF THE DISCLOSURE

There is great interest in measuring gravitational fields nearly perpendicular to the Earth's gravitational field. A sensitive gravimetric camera could "see" a person walking around through hundreds of meters of concrete or monitor shipping crates for hazardous materials. Currently, precision gravimetry tends to have relatively low resolution and is used primarily for large scale structures. Gravimetry is used extensively in mapping the earth's local gravity, oil and gas exploration, mining, mapping temporal geological shifts, the determination of Newton's gravitational constant and gravitationally imaging opaque systems. Precision of the order of 1 mGal (1 Gal=1 cm/s$^2$) to 1 µGal are often used for mapping geological variations. Both relative and absolute measurements are employed. A standard in the industry for absolute gravimetry is measuring interference fringes due to the free-fall of a corner cube in one arm of a Mach-Zehnder interferometer with a sensitivity of 100 µGal/Hz$^{1/2}$. Another competing gravimetric technology employs atomic interferometry achieving a resolution of 100 nGal after two days of integration. At the forefront, superconducting spheres suspended in the field of a superconducting coil have achieved 3 nGal resolution after one month integration or 1 nGal after one year. The current standard has been set by Kasevich's group (Stanford), which has achieved 1 nGal per shot (2 seconds) in their recently built 10 m atomic fountain and is working on a squeezed atom implementation with the potential for 20 dB improvement per shot.

BRIEF SUMMARY OF THE DISCLOSURE

Embodiments of precision gravimeters are disclosed herein. In a first embodiment, a gravimeter is based on a simple pendulum with a few 10's of ms response time. A shot noise limited acceleration sensitivity of 100 fm/s$^2$/Hz$^{1/2}$ or 10 pGal/Hz$^{1/2}$ can be achieved with a few mW of low-coherence laser power. The gravimeter is a physical pendulum which is allowed to oscillate in only a single plane. The pendulum and interferometric readout measure relative gravitational fields perpendicular to the Earth's gravitational field using the fringes in the dark port of a displaced Sagnac interferometer operated in the inverse weak value regime. The system is small, lightweight, simple to build, easily portable, inexpensive, and requires no cryostat, or cold atom technology. This gravimeter can be scaled to several detectors to build a gravity camera. In this way, a one kg mass moving around at a few meters can be remotely tracked using only the gravitational attraction of the mass.

In a second embodiment, an gravimeter uses a long-period torsion pendulum. The shot noise limited predicted sensitivities are a function of the restoring torque or alternatively considered as the restoring period. A device according to this embodiment is able to remotely image precision gravimetric density profiles in nontrivial mass distributions (e.g., tumors in-situ). With relatively reasonable device parameters, the shot noise limited sensitivity of the torsion balance embodiment is sufficient to measure the center of mass of a 1 gram mass 10 cm away with picometer resolution. Used in a near-field configuration, the device may be used to, for example, measure the curvature of space due to the presence of 1 Watt of energy $$\left(\text{i.e., } m = \frac{E}{c^2} = 10 \; fg\right)$$

at a distance of a few mm.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Precision gravimeters are disclosed herein, suitable for studying gravitational fields perpendicular to the earth's gravitational field. The gravimeters may be used for fundamental studies of gravity, high resolution bulk imaging, as a part of a gravity camera, etc. Shot noise limited measurements with 1 mW of laser power predict precision of the order of 10 pGal/Hz$^{1/2}$.

Figure 1:
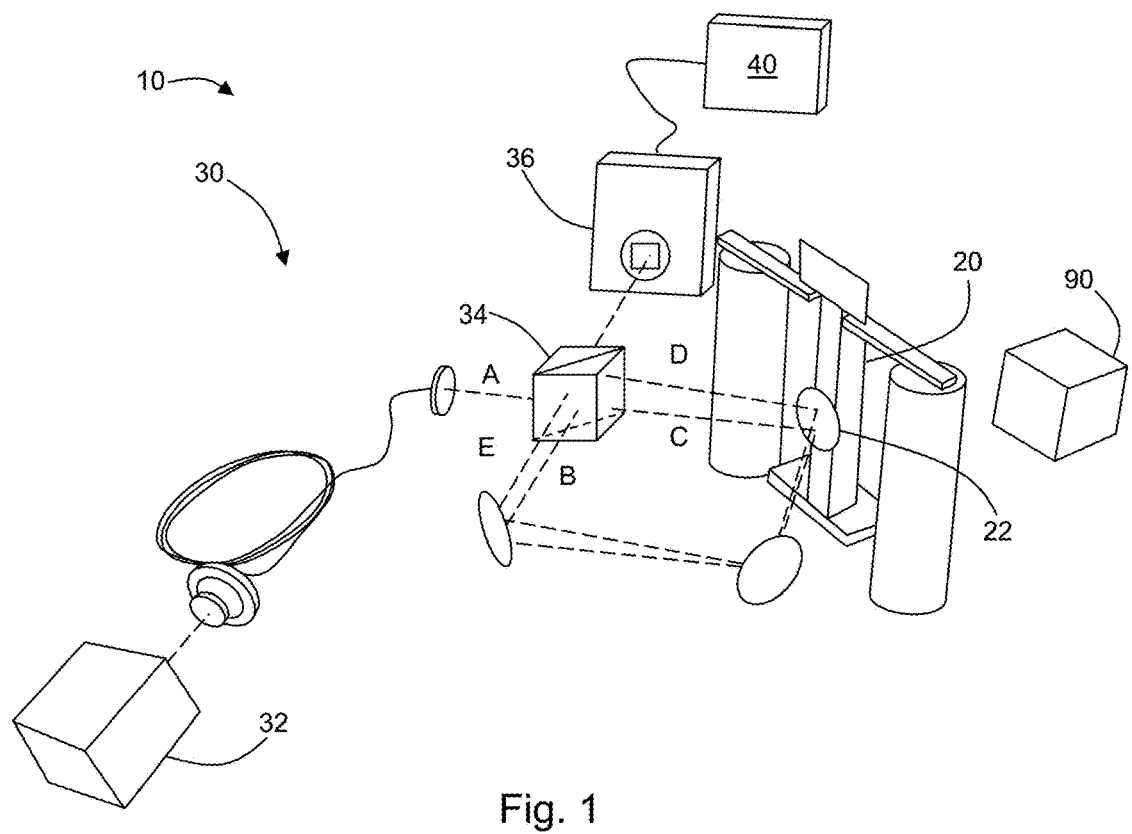
FIG. 1: In a first embodiment of the present disclosure, light from a fiber-coupled laser enters the input port of a 50/50 beam splitter of a displaced Sagnac interferometer. Clockwise and counterclockwise beams strike different heights of a mirror attached to a rigid pendulum. A tilt in the pendulum induces a relative phase between the two paths. The phase causes the shift of an interference fringe at the output of the interferometer. The interferometer is tuned to be close to the dark port with a single dark fringe of a bimodal interference pattern, which is referred to herein as the "inverse weak value regime." This interference configuration leads to dark fringe that moves rapidly for small phase shifts.

With reference to FIG. 1, the present disclosure may be embodied as a gravimeter 10 having a pendulum 20 and an interferometer 30 configured to measure a displacement of the pendulum 20. As is known in the art, the pendulum 20 may be considered to form a part of the interferometer 30, but for convenience the pendulum 20 will be generally referred to herein separate from the interferometer 30. The pendulum 20 may be a simple pendulum or a torsion pendulum—each of which is further described below. The pendulum 20 is configured to move in only a single plane. For example, where the pendulum 20 is a simple pendulum, the pendulum is configured to swing in a single vertical plane (see, e.g., FIG. 1). The pendulum 20 is damped, and in some embodiments the pendulum 20 is critically damped such that it moves to a new position in the shortest time possible without overshooting the new position. For example, in some embodiments, the pendulum comprises a swinging mass made from copper, and the pendulum is damped using a magnet (e.g., a rare-earth magnet, etc.)

The inferometer 30 includes a laser 32 for providing a laser beam A. A beam splitter 34 of the inferometer 30 is configured to split the laser beam A into a first beam B and a second beam C. Where a Sagnac inferometer is used, the first beam B and second beam C propagate in opposite directions and are each directed around a looped path to impinge on a mirror 22 affixed to the pendulum 20. The first beam B impinges on the mirror 22 at a first location to provide a first reflected beam D, and the second beam C impinges on the mirror 22 at a second location to provide a second reflected beam E. For example, where the pendulum is configured to move in a vertical plane, such as a simple pendulum, the first location and second location are arranged vertically with respect to each other. In embodiments where the pendulum is configured to move in a horizontal plane, such as a torsion pendulum, the first location and second location are arranged horizontally with respect to each other.

A photodetector 36 is configured to receive the first reflected beam D and the second reflected beam E. A controller 40 is in electrical communication with the photodetector 36. The controller 40 is configured to determine a displacement of the pendulum 20 based on interference between the first reflected beam D and the second reflected beam E. The controller 40 may be, for example, a programmable controller, programmed to determined the displacement of the pendulum.

In some embodiments, the pendulum is a torsion pendulum comprising a mass assembly. In some embodiments, the mass assembly is a rigid rod. In some embodiments, the mass assembly is made up of at least two masses rigidly coupled to each other, such as, for example, coupled using a rigid rod. The mass assembly is balanced on a fulcrum and configured to rotate about the fulcrum. The mass is biased to a first rotational position and configured such that a gravitational attraction (e.g., from an object) will rotate the mass assembly away from the first rotational position. For example, the mass assembly may be suspended by a wire, which acts as the fulcrum at the location where the wire is affixed to the mass assembly. In this way, the mass assembly is balanced while suspended by the wire, and able to rotate by twisting the suspension wire. Such twisting (rotational) motion also creates a restorative torque in the wire.

I. Weak Values

Precision gravimetry using weak value amplification techniques is discussed herein. Weak values were born through asking fundamental questions about quantum measurement limits. Unlike expectation values, weak values consider a normalized expectation of an operator (e.g., the Pauli operator $\hat{A}=|+\rangle\langle+|-|-\rangle\langle-|$) using pre- and post-selected quantum states $\psi_{i,f}$ $$A_w = \frac{\langle \psi_f | A | \psi_i \rangle}{\langle \psi_f | \psi_i \rangle}. \quad (1)$$

Because weak values can be much larger than their respective expectation values when $\langle \psi_f | \psi_i \rangle \to 0$, they have been used to amplify small effects. Weak value amplification has been shown to be exceptionally valuable in suppressing technical noise in precision measurements. While these techniques do not beat the shot noise limit (with some exceptions), they can come close to reaching it because of the dramatically suppressed technical noise. Of particular interest is the recent inverse weak value work where an angular tilt measurement noise floor of 200 frad Hz$^{-1/2}$ was achieved. Remarkably, this sensitivity was for signals down to 1 Hz, where noise suppression can be incredibly difficult. This tilt corresponds to a displacement of less than a hair's breadth at the distance of the moon in one second of measurement time using only a few milliwatts of laser power. Using these techniques for precision gravimetry, even at the classical optical fundamental limits, they would push gravimetric sensitivity by several orders of magnitude beyond the state-of-the-art.

II. Inverse Weak Value Interferometry

A specialized weak values interferometer employs a laser beam of transverse width σ in a Sagnac interferometer. The laser beam enters a beamsplitter and propagates in opposite directions around a Sagnac interferometer. When the beams recombine, a small relative phase φ between the two returning beams causes a small transverse tilt, k, of the mirror attached to the pendulum to be amplified in the (nearly) dark port of the beamsplitter. The weak value limit occurs when φ»kσ. For this particular setup, the amplification of the small transverse tilt k shows up in the dark port beam as a spatial shift by kσ$^2$/φ. In terms of weak values, the pre-selected state $\psi_i$ is the field after passing through beamsplitter the first time. The post-selected state $\psi_f$ is set by a combination of a phase shift and the second pass through the beamsplitter. The tilt of the mirror yields a small amount of which-path information of a photon in the interferometer, which is a weak measurement of $\sigma_z$.

Conversely, for an inverse weak values experiment, the parameters satisfy the inequality φ«kσ. In this case, we fix transverse tilt k and use the known k to amplify a small unknown phase. In this latter experimental regime, the interference pattern of the two beams in the dark port is now a bimodal distribution with a dark fringe at the center of the interference pattern for φ=0. The dark fringe moves rapidly with small changes in relative phase. These phase shifts are determined by measuring the relative intensity of the left versus right side of the interference pattern via a split detector. The amplification of the phase in this inverse weak value regime is given by the mean shift of the beam in the dark port, φ/k, which now is proportional to the inverse weak value $A_w^{-1}$.

A displaced Sagnac interferometer may be used to measure the relative phase shift φ for this inverse weak value regime. In a displaced Sagnac interferometer, two beams propagate with a transverse displacement (albeit parallel) in opposite directions. A small tilt of a mirror inside the interferometer causes a relative phase between the two paths since the path length increases for one path and decreases for the other. At the output port of the interferometer, the beams are brought back together to interfere with each other.

The shot noise limited angular resolution can be understood from a geometric argument. The relative phase between the two paths goes as δφ=2√2πLθ/λ, where √2 comes from impinging at 45 degrees, L is the distance between the centers of the beams propagating in opposite directions (see FIG. 2), λ is the wavelength of the laser light, and θ is the tilt angle of the mirror that we are interested in determining. Assuming the phase can be determined with shot noise limited sensitivity $$\Delta\phi = \frac{1}{2\sqrt{N}},$$

we find.

$$\Delta\theta_{SN} = \frac{1}{4\sqrt{2\pi}} \frac{\lambda}{L\sqrt{N}}, \qquad (2)$$

where N is the number of detected photons. Using L=1 cm, approximately 3 mW of laser power, and a wavelength of 500 nm, we achieve a shot noise limited angular sensitivity of 30 frad/Hz$^{1/2}$. The inverse weak value method of readout for the optical phase φ can achieve this shot-noise limited sensitivity, up to a factor of √π/2 associated with the resolution loss on the split detector.

Figure 2:
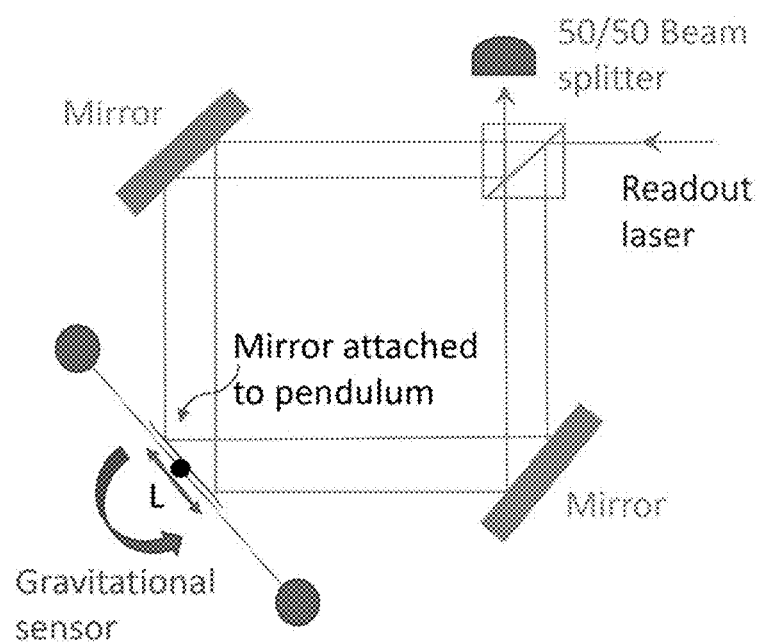
FIG. 2: A Sagnac interferometer with a torsion pendulum integrated as a gravity sensor.

This same inverse weak value setup with a displaced Sagnac is further described below. Further consideration is given to the physical limitations and sensing capabilities when the tilt mirror in the simple pendulum is replaced with a mirror rigidly connected to a torsion pendulum as shown in FIG. 2.

Simple Pendulum Gravimeter

An example of a pendulum gravimeter according to an embodiment of the present disclosure is shown in FIG. 1. A pendulum is in equilibrium with the static surrounding mass distribution. The introduction of another mass changes the equilibrium position of the pendulum (this is referred to as a relative gravimeter rather than an absolute gravimeter). If the pendulum is critically damped, it moves to its new equilibrium in the shortest time possible. The difficulty arises in determining the new relative angle of the pendulum due to the introduced mass.

A displaced Sagnac interferometer operated in the inverse weak value regime may be used to read out the tilt of a critically damped physical pendulum. A laser beam traverses two trajectories in the interferometer. One trajectory strikes the mirror on the pendulum at one height and the other beam strikes the mirror at a different height. The pendulum has a mass m and the height difference between the beams on the mirror is L. The pendulum design is such that it can only swing in a single plane. For convenience in discussion the operation of this embodiment, the pendulum was considered to be acted upon only by Earth's gravity and by the force of a distant remote object of mass M, which induces a force F perpendicular to Earth's gravity on the test mass of the pendulum. In the presence of the external object, the pendulum mass has an angle θ with respect to the vertical. The equilibrium condition is then F cos θ=mg sin θ. The small angle approximation was used to arrive at $$F = \frac{mg\phi}{2\,kL}.$$

Rather than measure the angular displacement θ of the mass, the relative distance the mass shifts Lθ was measured. For normal reflection from the pendulum, the relative phase is given by φ=2kLθ, where k is the wavenumber. A force equation $$F = \frac{mg\phi}{2kL}$$

was obtained. For shot noise limited measurements, an approximation $$\Delta\phi = \frac{1}{2\sqrt{N}}$$

is made, where N is the number of photons measured For relatively modest parameters, this system can measure very sensitive relative changes in gravity. For example, using visible light photons (k≈107 m$^{-1}$), approximately 1016 photons/second flux (approximately 1 mW of cw laser power) in the interferometer, a relative pendulum height L of 2 cm, an interferometric sensitivity on the order of 10$^{-13}$ m/s$^2$ or 10 pGal after one second of integration is made. Note that the presently-disclosed pendulum gravimeter differs from several previous pendulum gravimeters, which were based on a Fabry-Perot etalons.

A system according to the present embodiment can be used to measure modest masses at relatively large distances. The force F is simply the gravitational force due to a mass M at a distance d. Solving for d, yields:

$$d = \sqrt{\frac{4GkLM\sqrt{N}}{g}}. \quad (3)$$

Using the same numbers as above with a mass of M=1 kg, yields d≈25 m. In other words, the device is sensitive enough to measure one kilogram mass up to 25 meters away with a shot-noise limited signal-to-noise ratio of 1 after one second of integration.

Achieving the shot noise limited sensitivity for gravimeters is exceedingly difficult owing to significant environmental noise that can couple into the gravimeter. The present disclosure draws upon ideas in weak values where technical noise can be suppressed, in some cases, by several orders of magnitude and phase stabilization can be made to a high degree of precision. A displaced Sagnac interferometer is operated in the inverse weak value domain. For the inverse weak value, $k_t\sigma<1$, where $k_t$ is the transverse momentum shift and σ is the beam width. The operation of the interferometer in this configuration results in an average beam displacement given by $\phi/k_t$, which can make the displacement a very sensitive function of phase for small $k_t$. However, this large shift does not change the ultimate sensitivity, because it reduces the signal strength at the detector by $(k_t\sigma \cos(\phi/2))^2$.

The displaced Sagnac interferometer allows the beams to sample two different heights of the reflecting mirror while still achieving Sagnac stability and using low coherence sources. The parity of the interferometer is determined by the number of mirrors, in addition to the beam splitter, inside the interferometer. The Sagnac configuration cancels translational vibration noise since both the upper and lower beams are translated in the same way, which preserves the phase stability. Further, noise sources outside the interferometer such as beam jitter or detector jitter are not amplified. The Sagnac technique was found to be advantageous over the Michelson technique, having improved stability by several orders of magnitude.

Unfortunately, weak values cannot suppress all types of noise. If the noise is in the device that is generating the signal, there is no attenuation of the noise. This means that environmental noise (e.g., acoustic, microseismic, laser heating, laser shot-noise torques) may couple into the pendulum and limit the resolution of the detector. Measures may be used to lower such noise and improve the performance of the device. For example, noise may be reduced by using active isolation, having the interferometer in high vacuum, increasing the effective mass of the device against acoustic noise, balancing the readout laser with respect to the oscillation axis, etc.

In the experimental embodiment shown in FIG. 1, light from a fiber-coupled, free-running, diode laser was sent into a 50/50 beamsplitter. The light entering the interferometer was tilted upward, so that the exit beam from the interferometer was significantly higher than the input beam. The interferometer mirrors were all 2.5 cm in diameter. The displaced Sagnac was set such that the height differential of the clockwise and counter-clockwise beams was approximately one cm on the swinging pendulum. The swinging mass of the pendulum was a rectangular copper block of mass 500 g. A long Neodymium magnet (longer than the length of the block) was placed below the copper block to dampen the vibrations via Eddy currents. The height of the block relative to the magnet was tuned until critical damping was achieved. The 1/e damping time was approximately 50 ms. The copper mass was suspended by a light aluminum rod fastened to a razor blade with approximately 2.5 cm pendulum length. The razor blade edges touch two flat metal platforms. The mirror was an aluminum coating deposited on an aluminum substrate to ensure that all parts of the pendulum were electrically connected and grounded. The other mirror(s) in the interferometer were used for alignment of the interferometer. One of the mirrors in the interferometer had a multi-axis piezo-actuator to ensure precise alignment and adjustment of the dark fringe and bi-modal distribution. The light leaving the interferometer was then measured on a quad cell which differenced the intensity on one side of the detector from the other. The table was grounded and the copper block was electrically connected through the all-metal pendulum. The pendulum, but not the remainder of the interferometer, was put into a low vacuum acrylic container so that the light could freely propagate around the interferometer through the vacuum walls. The apparatus was on top of a breadboard on top of sorbethane pads, which rested on a large concrete slab embedded in a sand base and decoupled from the building. The system had a broad (10 Hz) microseismic spectrum centered at 8 Hz and a narrow 30 Hz signal, but a low background below 2 Hz. An active, vibration isolation table may be used.

To readout the pendulum shifts, the interferometer was aligned very close to the perfect dark port until a bimodal interference pattern with a large dark fringe results. One axis of the piezo actuated mount was then used to place the dark fringe in the middle of the intensity pattern. The lobes of the bimodal intensity pattern were aligned to two halves of a quad detector so that their difference signal could be measured. The rapidly moving fringe then resulted in large changes in the amount of light striking each side of the quad detector. The sensitivity of the device was calibrated using two different techniques. The first technique used readouts of the sum and difference voltages on the quad cell along with the measurement of the beam waist to determine $k_t$ and σ, respectively. The second technique was based on the careful characterization of the other piezo-actuated mirror in the interferometer. By applying a calibrated voltage on the other mirror and measuring the balanced signal, the mass-equivalent shift could be calibrated. Then the sensitivity of the device was calibrated with a known mass at a given distance while monitoring the signal voltage. This allowed for calibration of the signal response for the given test mass for that alignment. While the ultimate sensitivity of the inverse weak value and the standard homodyne technique resulted in the same shot noise limit, the inverse weak value was useful, because the small phase shifts that result from very small pendulum tilts can lead to large dark fringe shifts, which are easily determined from the detector.

Preliminary measurements of the exemplary device were performed using a lock-in amplifier. A 1.5 kg mass was placed on a 3 rpm turntable. The center of the turntable was 46 cm from the center of mass of the pendulum. The 1.5 kg test mass was placed 17 cm from the center of the turntable. The experiments were performed early in the morning when the acoustic and seismic noise was at a minimum. The lock-in amplifier was able to find the signal and hold the voltage to 1 part in 10 of the central voltage. The lock-in voltage was close to the simulated value for the given experimental parameters. This would imply that gravitational attraction was measured to a few nanoGal after a few 10's of minutes integration. Further tests are expected to demonstrate linearity in mass and the quadratic dependence on distance. The use of further damping, vacuum, and vibration isolation is expected approach the shot-noise limited sensitivity without the need for the lock-in amplifier.

Torsion Pendulum

Figure 3:
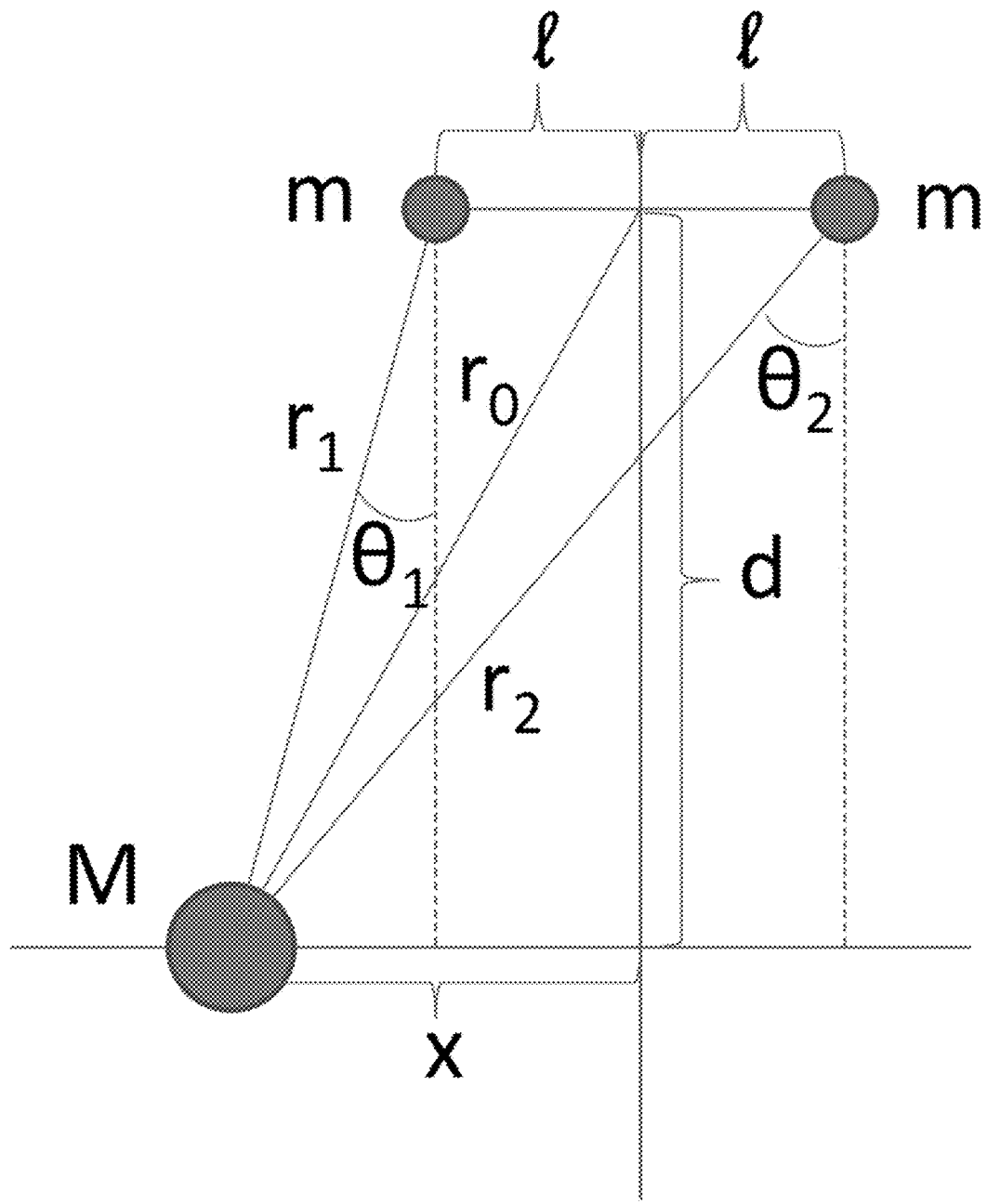
FIG. 3: A torsion pendulum according to another embodiment of the present disclosure is formed by attaching two mass m with a rigid, massless rod, of length 2$\ell$ and fixing the center of mass in place, able to rotate only. A nearby mass M creates a torque on this torsion pendulum, causing it to rotate to an equilibrium angle $\delta\theta_0$, which is detected optically. Lengths, angles, and mass labels are shown in the figure.

In a second embodiment, shown schematically in FIGS. 2 and 3 a gravimeter is configured as a torsion pendulum. Deflection of the pendulum is read using a displaced Sagnac interferometer as described above, except that the displacement L of the readout beams is in the horizontal plane (rather than from beams at different heights as in the above-described simple pendulum). An advantageous feature of this type of balance is that the sensitivity of the device can be tuned by modifying a restoring torque of the system, such as, for example, a restoring torque provided by a wire suspending the two masses m joined by a connecting rod.

The torsion pendulum will allow ultra-precise near-field gravimetric measurements and far-field gravity gradiometry for high resolution imaging.

III. Geometry and Torque Calculation

Suppose there is a system comprising a point mass M that is detected via a torsion pendulum comprising two masses m, connected via a rigid massless rod of length $2\ell$. The mass M is located according to FIG. 3 in relation to the oriented torsion pendulum. Assume M is a point mass for the time being. Suppose that the motion of all those objects will be characterized by their moment of inertia I about the axis defined by the pivot. By way of example, that axis could be comprised of a wire attached to the rigid body made up of the masses m at both ends. An external torque exerted from the gravitational force of a massive object will disturb the equilibrium position of the oscillator, which will oscillate until its damps to the new equilibrium position, as described in the next subsection.

A. Converting Torque Into Angle

In order to detect this small torque, recall that the pendula have a linear restoring torque quantified by the torsion spring constant $\kappa$, such that:

$$\tau_{ext} = -\kappa \delta\theta, \tag{4}$$

where $\delta\theta$ denotes the angular distance from its equilibrium position. Note that $\kappa$ can be empirically found by finding the period of the oscillations. When the pendulum swings freely, $$\tau_{ext} = I\alpha = 2m\ell^2 \ddot{\theta} = -\kappa\delta\theta, \tag{5}$$

where $I = 2m\ell^2$ is the moment of inertia. Putting this equation in the form $\ddot{\theta} + \omega_0^2\theta = 0$, the natural frequency of the pendulum is found to be $\omega_0 = (1/\ell)\sqrt{\kappa/(2m)}$, which may be inverted to find $\kappa$ from a measurement of the frequency, or period of the pendulum $\mathcal{T}$, $$\kappa = \frac{8\pi^2 m\ell^2}{\mathcal{T}^2}. \tag{6}$$

Adding in damping of the pendulum brings the dynamics into the form of Eq. (7).

For a vertical simple pendulum subject to Earth's gravitational field, the restoring force is simply the gravitational acceleration from the earth, causing a restoring torque of $\tau = -gm\ell\,\delta\theta$ for small angles. This also gives rise to dynamics of the form Eq. (7) but with a natural frequency given by $\omega_0 = \sqrt{g/\ell}$.

The source of the gravitational signal is a mass M near the pendulum, thereby applying an external torque $\tau$. We wish to measure this signal. We assume that $\tau$ can be time-dependent in general. Damping of the oscillations will be critical for a quickly responding detector, so we also add a velocity-dependent damping term, to find the equation of motion of a damped/driven oscillator, $$\ddot{\theta} + 2\zeta\omega_0\dot{\theta} + \omega_0^2\theta = \tau(t)/I \tag{7}$$

Here, $\omega_0 = \sqrt{\kappa/I}$, and $\zeta$ is a dimensionless damping coefficient. The underdamped case corresponds to $0 \leq \zeta \leq 1$, whereas the overdamped case corresponds to $\zeta > 1$. The general solution for $\tau = 0$ (the homogeneous solution) can be expressed as $$\theta_{hom(t)} = e^{-\zeta\omega_0 t}\left\{\theta_0\left[e^{\omega_0 t\sqrt{\zeta^2-1}} - \sinh(\omega_0 t\sqrt{\zeta^2-1})\right] + \left[\frac{\zeta\theta_0 + \dot{\theta}_0/\omega_0}{\sqrt{\zeta^2-1}}\right]\sinh(\omega_0 t\sqrt{\zeta^2-1})\right\}, \tag{8}$$

where $\theta_0$ and $\dot{\theta}_0$ are initial conditions for the pendulum, and the terms inside the braces $\{\ldots\}$ describe decay for the overdamped case, and oscillations in the underdamped case.

If $\tau$ is fixed in time, for large damping $\zeta$, then the oscillator will converge to its new equilibrium position exponentially in time with a rate $\zeta\omega_0$ according to the solution (8). After this time, the angular displacement can be approximated by the fixed point of (7), given by $$\bar{\theta} = \frac{\tau}{I\omega_0^2} = \frac{\tau}{\kappa}. \tag{9}$$

We wish to design the pendulum to respond sensitively to stimuli from the target objects, but do not want it to oscillate for a long time before returning to a new equilibrium position. There is a trade-off between sensitivity of the measurement and the speed of the response as will be explored in the following sections.

B. Pendulum Model

The pendulum is fixed with respect to its center of mass motion, and is allowed to only rotate about its center of mass in the plane of the figure. This geometry can be analyzed by computing the torque about the middle of the torsion pendulum.

Plane trigonometry dictates that the distances defined in the figure are given by:

$$r_1^2 = (x-\ell)^2 + d^2, \; r_2^2 = (x+\ell)^2 + d^2, \; r_0^2 = x^2 + d^2. \tag{10}$$

The gravitational force between mass M and mass $m_j$, according to Newton, is given by:

$$F_j = -\frac{GM_jM}{r_j^2}\hat{r}_j. \quad (11)$$

The torque $\tau$ generated on mass j is given by:

$$\tau_j = \ell F_j \cos\theta_j, \quad (12)$$

where $F_j$ is the magnitude of gravitational force of mass M on mass $m_j$.

For a Simple Pendulum (SP), we only have one of the masses in the pendulum of FIG. 3. The net torque is:

$$\tau_{SP} = GmM\frac{\ell d}{r_1^3}. \quad (13)$$

The above results are relevant for a single test mass other than the pendulum mass. In the following sections we will use either the earth's gravity as the restoring force (as usual pendulums do), or by orienting the pendulum perpendicular to the earth's field, can also use the restoring force of a rod to obtain longer periods.

For a balanced Torsion Pendulum (TP), we include torques that nearly counterbalance each other (the torque on mass 1 is positive in sign, and the torque on mass 2 is negative in sign). The net torque is given by:

$$\tau_\Sigma = \sum_j \tau_j = \tau_{TP} = \ell dGmM\left(\frac{1}{r_1^3} - \frac{1}{r_2^3}\right), \quad (14)$$

where we have replaced $\cos\theta_j = d/r_j$.

The simple pendulum responds to the bare force on the sensing mass, and thus decays as $1/r^2$ with respect to the test mass distance. The torsion pendulum balances the average force, and thus responds to the gradient of the field across the size of the torsion pendulum. This effect leads to a less sensitive response to objects far away; it may be beneficial since it efficiently screens out far away objects and allows the sensor to focus on nearby objects.

C. Limiting Case

In some experiments, this expression (Eq. (14)) can be further simplified because it is expected that $\ell \ll d, x, r_0$. The expression for $\tau_\Sigma$ is proportional to the difference of the functions $g(\ell)-g(-\ell)$, where:

$$g(\ell) = \frac{1}{(d^2 + (x-\ell)^2)^{3/2}}. \quad (15)$$

Since $\ell$ is a small parameter, one can approximate $g(\ell)-g(-\ell) \approx g'(0)(2\ell)$. It is found that:

$$g'(0) = \frac{3x}{r_0^5}, \quad (16)$$

so that, to a good approximation, $$\tau_\Sigma = \frac{6GmMd\ell^2 x}{r_0^5} = \frac{6GmM\ell^2\cos\theta\sin\theta}{r_0^3}, \quad (17)$$

where we approximate $\theta_1 \approx \theta_2 = \theta$, and write $x=r_0\sin\theta$ and $d=r_0\cos\theta$. In this limit, the sensor does not respond to the net force, but rather to its gradient, as indicated by the $r^{-3}$ law.

In this limit, the one-armed device (SP) equilibrates to an angle $$\bar{\theta}_{SP} \approx \frac{GM\cos\theta}{\ell\omega_0^2 r_0^2}, \quad (18)$$

while its two-armed counterpart equilibrates to $$\bar{\theta}_\Sigma \approx \frac{3GM\sin\theta\cos\theta}{\omega_0^2 r_0^3}, \quad (19)$$

In both cases we have used Eq. (9). We stress that in both cases, the sensing mass m only appears in the natural frequency, and in the case of the torsion pendulum, the length $\ell$ also drops out, indicating that small sensors work as well as large ones so long as their periods are the same.

Figure 4A:
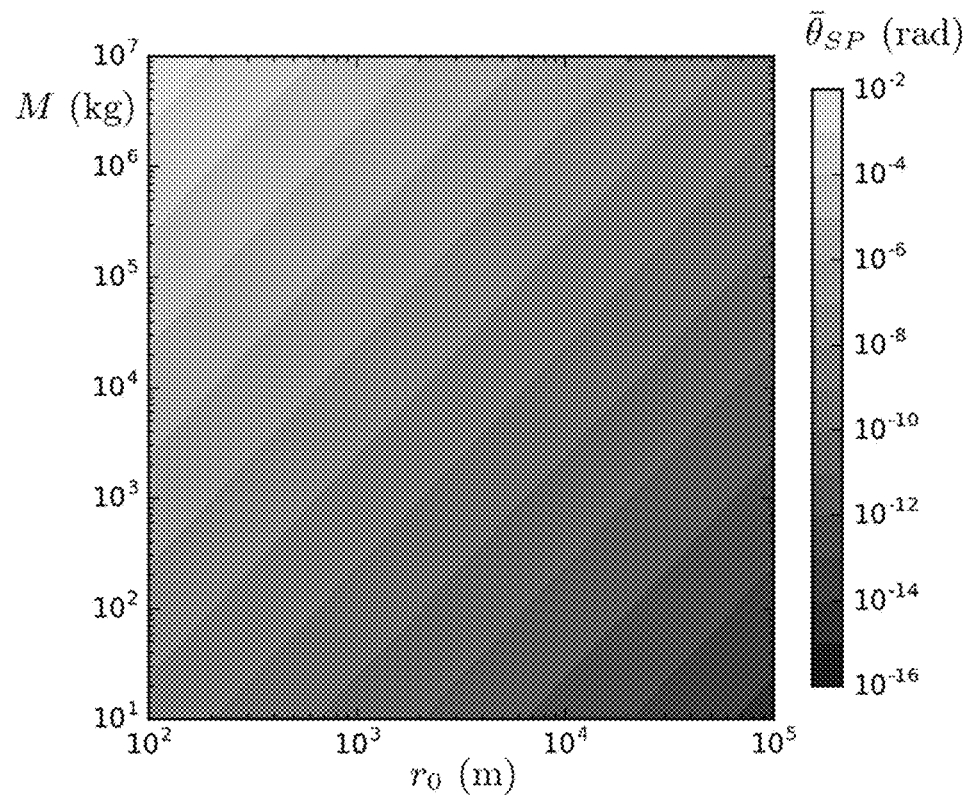
FIGS. 4A and 4B: We plot the static deflection angle $\bar{\theta}$ (Eq. (9)) for the torque in the one-armed torsion pendulum (Eq. (18)) (4A), and the two-armed torsion pendulum (Eq. (19)) (4B), as shown on the colorbars, as a function of target distance $r_0$ (x-axis) and target mass M (y-axis). The plot, given as a log-log-log density plot, shows three decades of distance, and six of mass. The test mass M is placed at the point of optimal sensitivity for each device. The parameters in Table I are used for these plots.
Figure 4B:
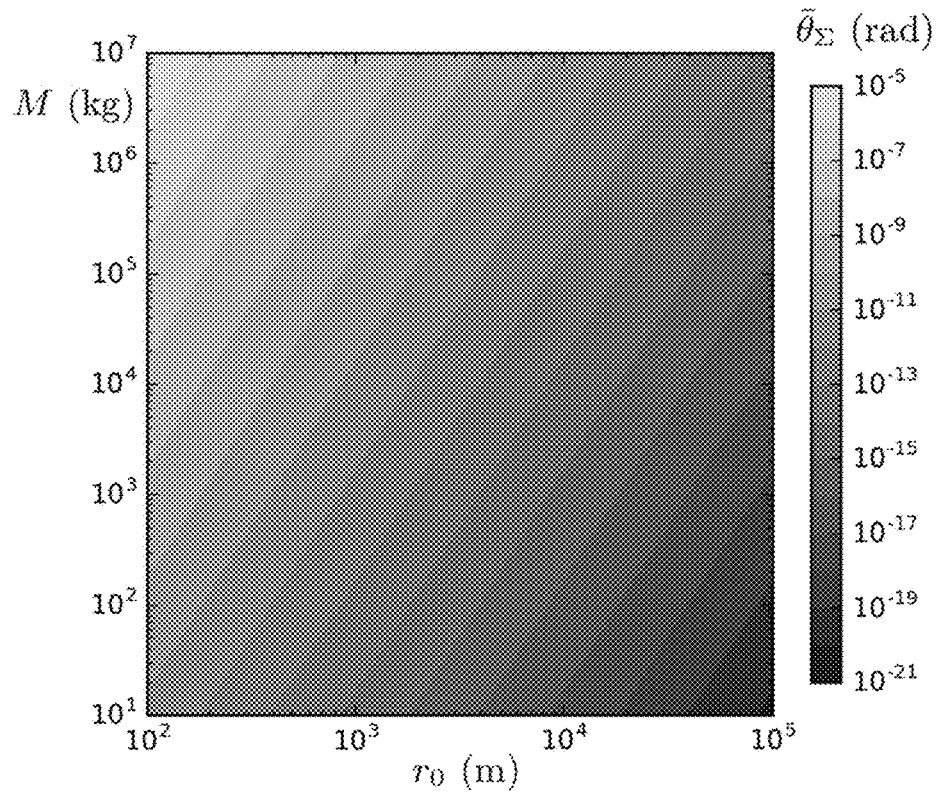
Figure 5A:
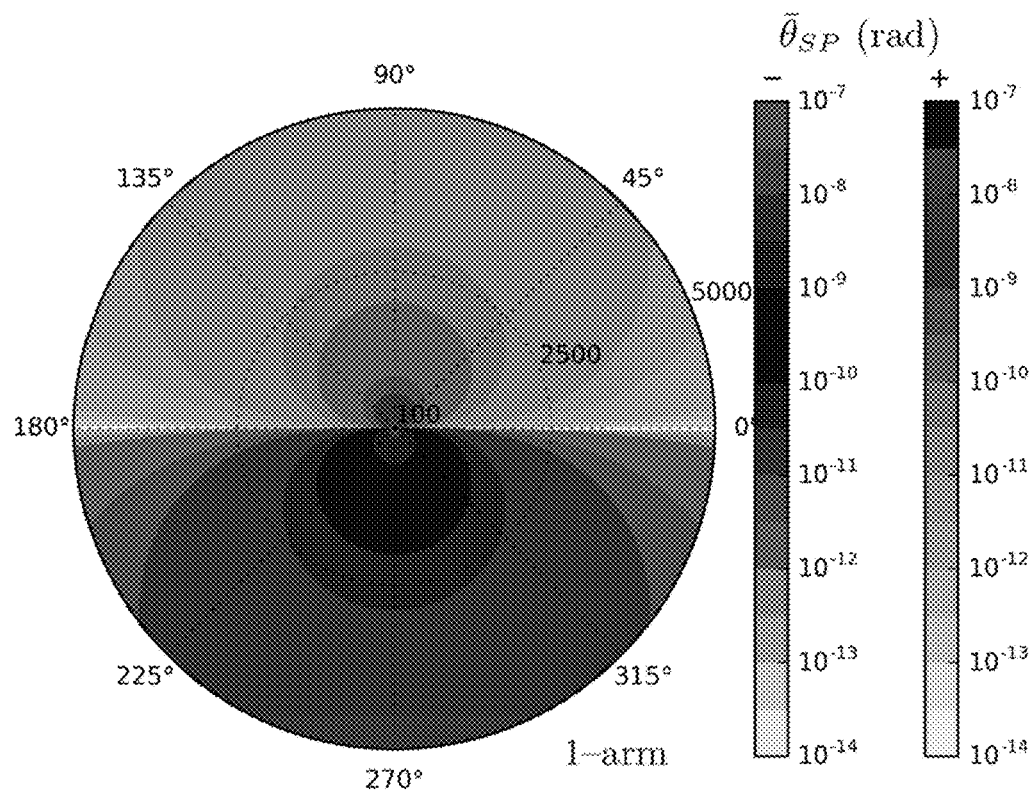
FIGS. 5A and 5B: Contour plots of the angular displacement $\bar{\theta}$ due to a static mass M=100 kg placed in the plane of a 1-armed (5A) and 2-armed pendulum (5B), as a function of $r_0$ and θ. The Figures show the entire angular dependence θ, and show values of $r_0$ ranging from 100 m to 5 km in the radial direction. The + shading legend denotes an angular displacement in the +θ (CCW) direction, while the − shading legend denotes dection in the −θ (CW) direction. Angular blindspots are at the juncture of the two shade gradients, where the deflection is zero, no matter the value of $r_0$ or M. Numerical values for the pendulum correspond to those shown in Table I. The − shading legend corresponds to the lower half (5A) and the upper left and lower right (5B), and the + shading legend corresponds to the upper half (5A) and the upper right and lower left (5B).

These expressions can be applied to make an approximate survey of the sensitivity of the device to different objects. Specifically, we show the best-case angular response to a target M at distance $r_0$ in FIGS. 4A and 4B, and we plot the angular dependence of the sensing for each device in FIGS. 5A and 5B. Some example values for a small torsion pendulum are given in Table I, in reference to the geometry of FIG. 3.

TABLE I

Example parameter values

| | | |
|---|---|---|
| Pendulum mass | m | 100 g |
| Wavelength of light | λ | 500 nm |
| Pendulum length | $\ell$ | 5 cm |
| Period of oscillator | $\mathcal{T}$ | 500 s |
| Torsion spring constant | κ | 7.9 × $10^{-8}$ kg m²/s² |
| Length between beams on the mirror | L | 1 cm |

The above analysis may be extended to a continuous mass distribution by replacing the mass M by a differential element $dM=\rho(x)dx$, where a body with mass per unit distance $\rho(x)$ distributed along the x direction is imagined. In that case, the next torque for such a mass distribution is given by:

$$\tau_\Sigma = \int f(x)\rho(x)dx. \quad (20)$$

In the general case, $f(x) = \ell\, dGm(r_1(x)^{-3} - r_2(x)^{-3})$, whereas in the limiting case, it is given by $f = 6\ell^2 dGmx/(d^2+x^2)^{5/2}$.

IV. Noise Considerations

It is noted that the pendulum will experience several kinds of noise that may be mitigated in order to reach the fundamental limits of angle detection that the system is capable of. This section focuses on three types of noise: thermal noise, measurement heating noise, and quantum noise of the oscillator.

A. Thermal Noise

Contributions of the thermal noise from the surrounding environment can be computed via the equipartition theorem assuming large temperatures. Both the mean kinetic energy and potential energy are given by the thermal energy for one degree of freedom each. In general, $$\frac{1}{2}\kappa \langle \delta\theta^2 \rangle = \frac{\hbar\omega}{4}\coth(\hbar\omega/2k_B T). \tag{21}$$

In the limit of high temperatures, the equipartition of potential energy indicates that $$1/2\kappa \rangle \delta\theta^2 \langle = 1/2 k_B T, \tag{22}$$

which gives the typical rms noise of the torsion pendulum, $$\delta\theta_{rms} = \sqrt{k_B T/\kappa}. \tag{23}$$

The value can be estimated using the values given in Table I, and room temperature $k_B T = 4.1 \times 10^{-21}$ J to find, $\delta\theta_{rms} = 2.3 \times 10^{-7}$ rad. In order to access below the picoradian regime, it will therefore be necessary to either cool the oscillator, or to time-average the signal for some time. One could also increase the value of $\kappa$, but that would also decrease the angular precision.

B. Measurement Heating

As demonstrated in the first section, it is advantageous to apply as much optical power as possible to the interferometer to maximize the precision of the angle measurement. However, because the gravitational sensor is freely moving, it is possible that the sensing laser may drive excitations, effectively heating the torsion pendulum. We will now calculate the effect of this heat, which may put a bound on the sensing power.

The displaced Sagnac geometry (see FIG. 2), causes two laser beams to strike the sensing mirror at a lever arm $$\pm \frac{L}{2}$$

from the axis of rotation. We can imagine that photons each carrying energy $hc/\lambda = \hbar k_0 c$ arrive at the mirror at discrete times, either at $$+\frac{L}{2} \text{ or } -\frac{L}{2}.$$

On average, since the intensity of the light on the left and right side of the mirror is the same from the 50/50 beamsplitter, we have $$\langle N_+ \rangle = \langle N_- \rangle = \frac{N}{2}.$$

The time-averaged optical power being applied to the pendulum is $\overline{P} = \langle N \rangle \hbar k_0 c/T$, which could be understood as arising from $$\overline{P} = \frac{1}{T}\int_0^T \hbar k_0 c \left(\sum_n^{N_\pm} \delta(t-t_n)\right) dt, \tag{24}$$

provided that the duration T is much longer than the typical time between individual photons, which arrive at the $t_n$, and where $\overline{P} = \overline{P}_+ + \overline{P}_-$. Each photon which strikes the mirror imparts an impulse $\Delta p = \hbar k_0/\sqrt{2}$, where the factor $\sqrt{2}$ arises because the photons strike the mirror at an angle. The time-averaged torque may be expressed using the same logic as above, i.e., $$\overline{\tau}_\pm = \frac{1}{T}\int_0^T \frac{L}{2}\Delta p\left(\sum_n^{N_\pm} \delta(t-t_n)\right) dt, \tag{25}$$

or for $T \gg |t_n - t_{n-1}|$, $$\langle \overline{\tau} \rangle = \langle \overline{\tau}_+ - \overline{\tau}_- \rangle = \frac{L k_0 \hbar}{T\sqrt{2}}\langle N_+ - N_- \rangle. \tag{26}$$

Since the number of photons striking on either side of the point of rotation is equal on average, we see that $\langle \overline{\tau} \rangle = 0$; however, there will be fluctuations from the coherent states of light, which depend on $$\langle (N_+ - N_-)^2 \rangle = \langle N_+^2 - N_-^2 - 2N_+ N_- \rangle = \langle N \rangle. \tag{27}$$

The term $\langle N_+ N_- \rangle = 0$ because the $\pm$ photon beams are uncorrelated. Furthermore, given the geometry and using statistical properties of coherent states, $$\langle N_+^2 \rangle = \langle N_+ \rangle = \frac{N}{2} \text{ and } \langle N_-^2 \rangle = \langle N_- \rangle = \frac{N}{2}.$$

Therefore the torque fluctuations averaged over a given time interval T are given by $$\langle \overline{\tau}^2 \rangle = \frac{L^2 k_0^2 \hbar^2}{2T^2}\langle (N_+ - N_-)^2 \rangle = \frac{L^2 k_0^2 \hbar^2}{2T^2}\langle N \rangle = \frac{L^2 \overline{P}^2}{2c^2 \langle N \rangle}, \tag{28}$$

where we have re-written the duration of the experiment in terms of the power $\overline{P}$, and used the relationships above. This leads to an increased variance of the angle, defined by $\langle \delta\overline{\theta}^2 \rangle = \langle \overline{\tau}^2 \rangle/\kappa^2$, or taking the square root, fluctuations in the coherent states of light lead to $$\delta\overline{\theta} = \frac{L\overline{P}}{\kappa c\sqrt{2N}}. \tag{29}$$

Equating with the shot noise limited value (2), we find that the measurement heating makes a smaller contribution to the noise than shot noise, when the condition $$\frac{L^2 \overline{P} k_0}{\kappa} \leq \frac{c}{2} \tag{30}$$

is satisfied. This implies that for the values in Table I, the noise contribution due to measurement heating would overtake the shot noise when the measurement laser power exceeds $\overline{P} = 9.3$ mW.

C. Quantum Noise

An intriguing aspect of the oscillators is the fundamental limitation of sensitivity due to quantum noise. As will be shown, the shot noise limited resolution is approximately equal to the quantum ground state uncertainty of the oscillator when the integration time is approximately equal to the period of the pendulum. From a quantum mechanical perspective, ground state quantum noise limitations are quite interesting in light of the large masses used in these experiment. Such studies may be valuable in probing quantum gravity. On the other hand, this also places fundamental noise limits on the resolution.

To determine the ground state angular uncertainty, we set the mean potential energy of the oscillator to the ground state energy of the oscillator $$(1/2)\kappa \langle (\delta\theta)^2 \rangle = (1/4) \hbar \omega, \tag{31}$$

which follows from Eq. (21) when $k_b T \ll \hbar \omega$. Solving for the angle we obtain $$\delta\theta_{rms} = \sqrt{\hbar \omega / 2\kappa}. \tag{32}$$

Using values listed in Table I, we find $\delta\theta_{rms} = 2.9 \times 10^{-15}$ rad. This resolution can be achieved when the integration time is roughly equal to the period of the pendulum using a few milliwatts of laser power.

V. Limits of Resolution

The results of the previous sections can now be combined to give the sensitivity limits of the SP and TP to forces, which can be translated into either mass or range uncertainty. Using Eq. (9) and the angular uncertainty Eq. (2), we find at the optimally sensitive response point (x=0 so d≈r, θ=0), the resolution of (usual) simple pendulum acceleration a, relative to the gravitational acceleration g of the SP to be $$\frac{\delta a}{g} = \delta\theta \tag{33}$$

Consequently, the acceleration uncertainty in units of the accelerations due to gravity near the surface of the earth is simply the same as the angular uncertainty.

If instead, we consider a one-armed torsion pendulum with a torsion constant of κ, oriented perpendicular to the gravitational field of the earth, then the period of the oscillation can be much longer. The angular resolution is given by Eq. (18) so the acceleration uncertainty is reduced to $$\frac{\delta a}{g} = \frac{\kappa \delta\theta}{g \ell m}. \tag{34}$$

For the parameters in Table I, this reduces the acceleration uncertainty by a factor of $1.6 \times 10^{-6}$, leading to 60 zepto g $Hz^{-1/2}$. Remarkably, the speed is only a thousand times slower, because of the inverse square relationship of Eq. (6). In either geometry, the acceleration is given by $a = GM/r_0^2$, so the sensitivity of the acceleration to a change in test mass $\delta M$ at fixed $r_0$, or a change in the distance $r_0$ for fixed test mass M is given by $$\delta a = G\delta M/r_0^2 - 2GM \delta r_0/r_0^3, \tag{35}$$

from which the mass or distance uncertainty is easily found. The response of the one-armed torsion pendulum is plotted in FIG. 4A for different values of test mass M and range $R = r_0$.

For a balanced torsion pendulum, a test mass far from the pendulum will respond according to Eqs. (16, 18). Setting $\theta = \pi/4$ for maximum sensitivity, the angular response to a gravitating body will be $$\delta\theta = \frac{3 G m M \ell^2}{\kappa r_0^3}. \tag{36}$$

The $r_0^{-3}$ law gives a smaller sensitivity, but also screens off distant objects. This cannot be directly translated into acceleration of a single mass, but gives the response of the detector to the gradient of the gravitational field. The torsion pendulum response is plotted in FIG. 4B for different values of test mass M and range $R = r_0$.

Figure 5B:
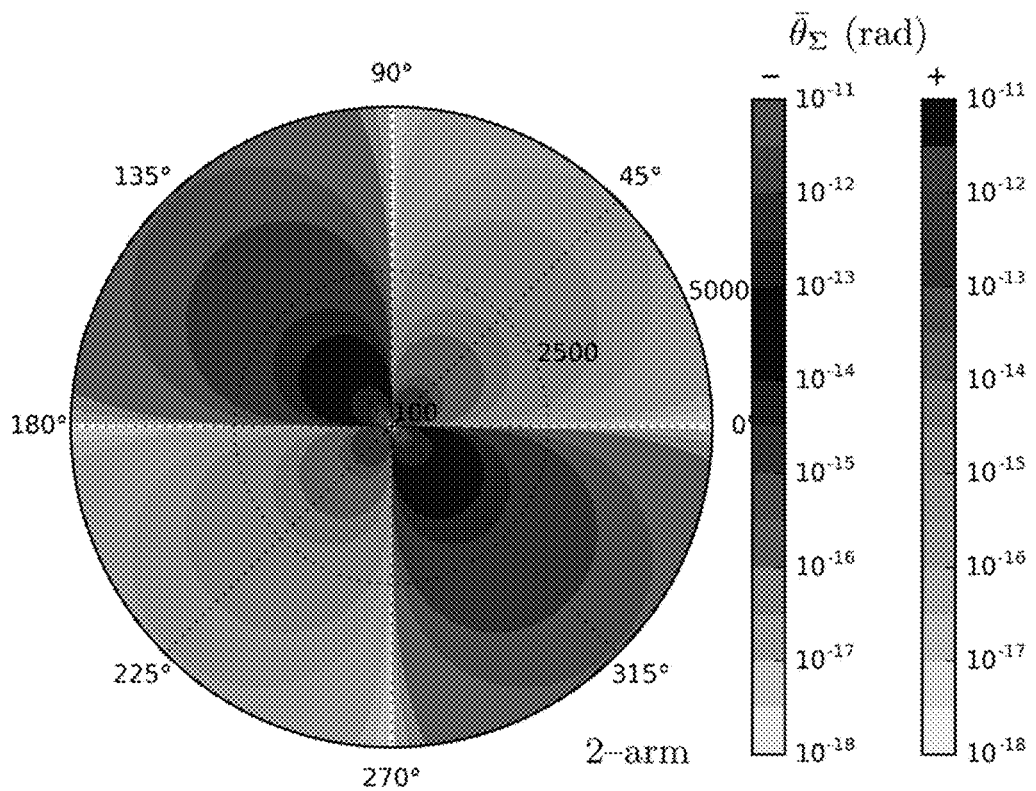

We now briefly discuss the angular response of both types of pendula as the test mass is placed at different angles relative to the axis of rotation. The one-armed torsion pendulum has blind spots at $\theta \approx 0$ and $\theta \approx \pi$, where a target mass applies no torque, and its sensitivity is maximized at $\theta \approx \pi/2$ and $\theta \approx 3\pi/2$. The two-armed torsion pendulum has four blind-spots, as illustrated in FIG. 5B. Notice that the scaling of the deflection angle in terms of the one-armed pendulum's construction parameters really depends only on $\ell$, and that the smaller we make $\ell$, the larger the deflection angle will get (the moment of inertia in the denominator wins out over the greater torque with greater arm length). The $\ell$ dependence cancels out entirely from the two-armed device, except for its appearance in the natural frequency.

Near Field Measurements

To illustrate the sensitivity of the device, assume that the mass of interest is in the near-field of the pendulum (i.e., a distance of the mass from one pendulum mass is much closer than the separation between the two pendulum masses), the minimum detectable acceleration of a single mass close to the test mass is:

$$a = \frac{4\pi^2 l}{k L T^2 \sqrt{N}}, \tag{37}$$

where l is the radius of the pendulum masses, k is the wavenumber, L is the distance between the beams reading out the deflection of the pendulum, N is the number of photons measured during an integrated time interval and T is the period of the pendulum. For a critically damped pendulum, the damping time is of the order of T/2. For r=0.2 m, L=0.1 m, T=1000 s and a 3 mW beam, the shot noise limit for acceleration is $10^{-22}$ m/s$^2$. To demonstrate the force sensitivity of the device, such a gravimeter is sufficient to measure the effective mass ($m = E/c^2$) of 1 Watt ($m = 10^{17}$ kg) of energy at a few mm away from the pendulum, assuming all other effects due to the energy could be ameliorated (for example, one can imagine a resistor dissipating 1 W close to the pendulum with an ultra-broadband mirror reflecting the radiation away from the gravimeter in between). Using a pendulum mass of 100 g, the pendulum could measure forces with a resolution of 10 yocto Newtons, which could be used in almost any force measurement from protein folding to the Watt Balance. Interestingly, a ns, visible, single-photon normally reflecting from a mirror, imparts $10^{-19}$ N. There may be many limitations on the resolution of the device including the fact that shot noise in the read-out laser will cause torques on the mirrors.

GravCam, Solving the Inverse Problem

More than one of the devices can be arrayed. For example, with four such devices, a three-dimensional determination of the position and mass of an object can be determined assuming a large enough signal-to-noise ratio using the correlation of the independent detectors. Movement of the object may also be determined. Because the damping times are still relatively long, the objects must move relatively slowly, but with a knowledge of the velocity of an object (velocity can be determined from temporal responses of the pendula), additional structure information can be gathered. Further, with a large array of sensors allowed to pivot about their tilt-axis or translated, even static environments can be gravitationally imaged.

The sensitivity of embodiments of the disclosed device is expected to be sufficient to gravitationally map density variations within the body. As a simple proof-of-principle simulation, a uniform smaller sphere of known density, but unknown size and position inside a larger sphere of known radius and uniform density was considered. For simplicity, the position along a single axis was estimated. With two unknowns, size and single-axis position, only two gravity measurements were needed. Two gravity detectors separated by a distance of one meter with the same $z=0$ cm, $y=0$ cm coordinate were used. The center of each sphere was assumed to have a $z=30$ cm and $y=0$ m, but unknown x for the smaller sphere, albeit within the larger sphere. For the simulation, the density of the larger sphere was assumed to be $\rho_L=1000$ kg/m$^3$ (the density of water) and only a slightly higher density $\rho_S=1100$ kg/m$^3$ for the smaller sphere. The radius of the larger sphere was 10 cm and the center of the large sphere was half way between the two detectors. A precision of 10 pGal was assumed and using a smaller sphere radius of 3 cm. Solving the inverse problem, the simulation was found to predict the position of the smaller sphere to within 0.5 cm along the x axis and the simulation determined the mass to within 1%. The density problem is easier in Airport scanners where hidden objects typically have much higher density contrasts. In some embodiments, the detectors are moved such that even static environments can be imaged. Several pendula may be used in a gravity camera along with the torsion pendulum discussed later.

In another example, a torsion pendulum may be used to obtain high-resolution images, for example, when using the gravitational effects of both masses of the pendulum (see FIGS. 2 and 3). For simplicity, assume that the object of interest is close to centered between the masses (a small distance x from the symmetry line), but is a distance $d=l$ from the rotation axis. In other words, along the z-axis it is a distance r and along the x-axis it is a distance x. In this small distance limit, the net torque on the pendulum is given by $$\sum \tau = \frac{2GMmx}{r^2}.$$

Setting this equal to the restoring torque and taking the differential, an advantageous spatial resolution is found to be:

$$\Delta x = \frac{2\pi^2 l^4}{kLGMT^2 \sqrt{N}}. \tag{38}$$

Using the numbers from above, along with a mass of 1 g, a 2 picometer spatial resolution is achievable at 20 cm away. This would indicate that the gravimetric gradiometer may be used for performing high resolution imaging well beyond the diffraction limit deep inside a bulk object.

Suppose the torsion pendulum is used as a sensor to detect an unknown mass density profile $\rho(x)$. Suppose the mass distribution is moving at a constant speed v along the x direction. This will give a time-dependent torque $\tau_\Sigma(t)$ (proportional to the equilibrium angle $\delta\theta_0(t)$). Then, given this time dependent signal, the mass distribution $\rho(x)$ can be found.

The time-dependent torque is given by:

$$\tau_\Sigma(t) = \int_{-\infty}^{\infty} f(x)\rho(x-vt)dx. \tag{39}$$

Defining a coordinate $y=vt$, the central insight is to interpret this integral as a convolution $(f*\rho)(y)$ of two functions $f$ and $\rho$ (where * denotes convolution). By the convolution theorem, the unknown function $\rho(x)$ is given by:

$$\rho(x) = \int_{-\infty}^{\infty} \frac{dk}{2\pi} e^{ikx} (\tilde{\tau}_\Sigma(k) / \tilde{f}(k)). \tag{40}$$

where $\tilde{f}(k)$ and $\tilde{\tau}_\Sigma(k)$ are defined as the Fourier transforms of the functions $f(x)$, which is a known function, and $\tau_\Sigma(y)$, which is the measured data. It is noted that both the Fourier transform of the measurement data and the inverse Fourier transform to find the solution can be made with numerical fast Fourier transforms. Consequently, this procedure can be done very quickly, once the functional form of Fourier transform of $f(x)$ is known. The analytic form of the function $f$ is calculated below, giving the final step in the solution of the problem.

Fourier Transform of $f(x)$

The Fourier transform of $f$ (in the general case) is proportional to the difference of the Fourier transform of $g(x, \ell) - g(x, -\ell)$, where:

$$\tilde{g}(k, \ell) = \int_{-\infty}^{\infty} dx \frac{e^{-ikx}}{[(x-\ell)^2 + d^2]^{3/2}}. \tag{41}$$

The integral is nontrivial because of the branch cut. The result is found as:

$$\tilde{g}(k, \ell) = e^{-ik\ell} \frac{2|k|}{d} K_1(d|k|), \tag{42}$$

where $K_1(z)$ is the first modified Bessel function. This function vanishes at $k=0$ since $K_1(0)$ is finite, and decays exponentially at large k. Taking the difference of $\tilde{g}(k, \ell)$ at $\ell$ and $-\ell$, as well as restoring the prefactors, the following result is found, $$\tilde{f}(k) = (-4i)Gm \sin(k\ell)|k|\ell K_1(|k|d). \tag{43}$$

Together with the main result Eq. (40), the problem is solved. It is noted that the velocity v is unimportant, so long as it is slow enough to allow the torsion pendulum to come to equilibrium, and the optics to readout the angle to sufficiently high precision.

Figure 6:
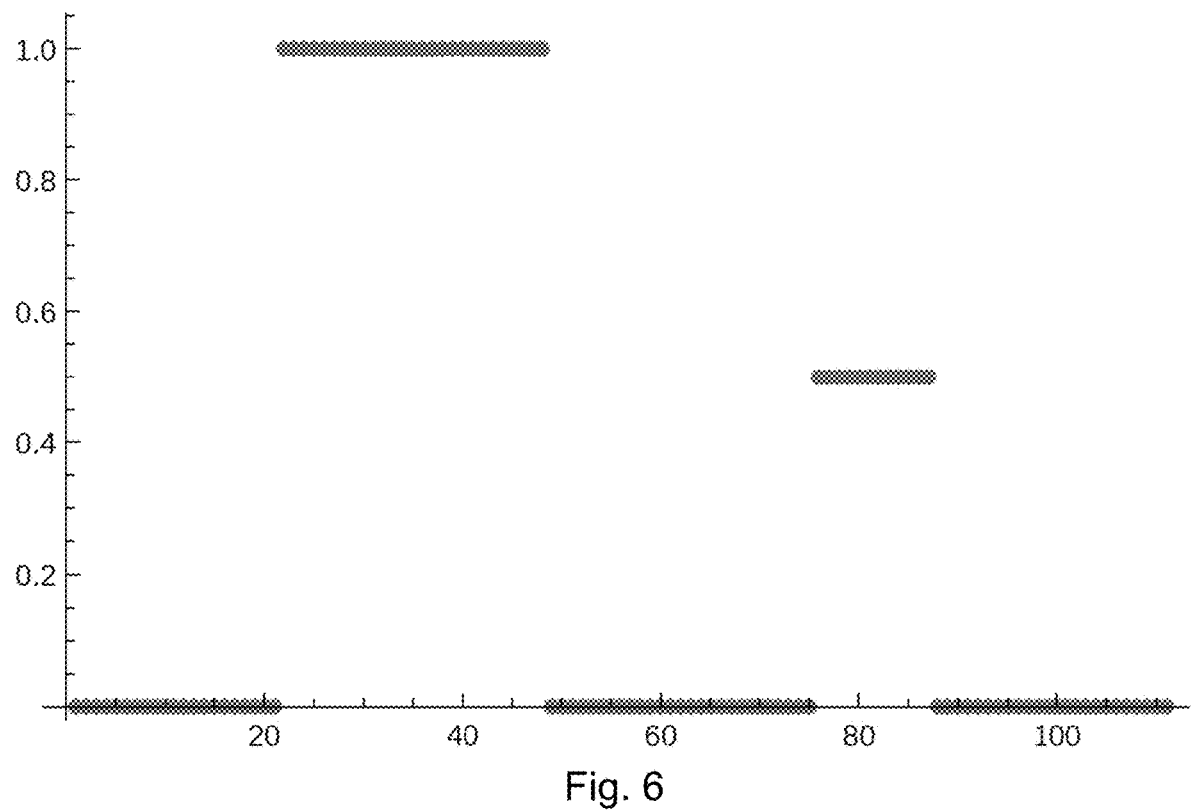
FIG. 6: Sample of a one dimensional image, given here as a piece-wise constant function.
Figure 7:
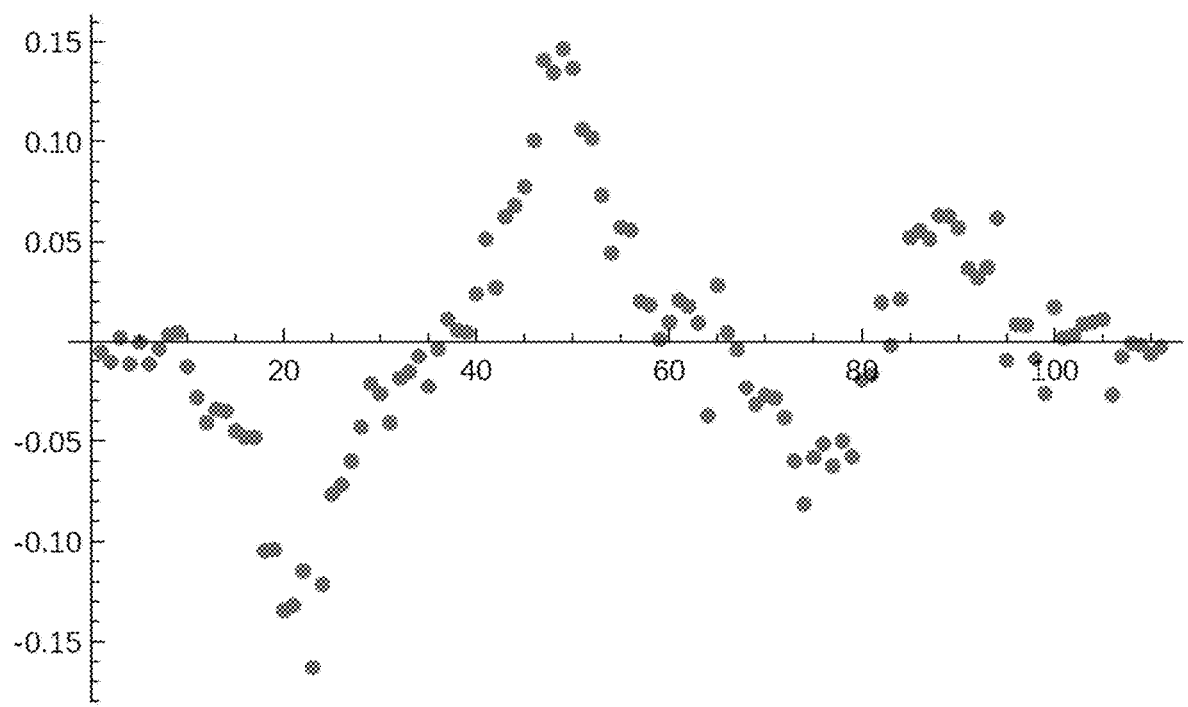
FIG. 7: Predicted net displacement signal of the pendulum for 1-D mass as a function of position with 10% Gaussian noise added. The signal is given proportional to the net displacement angle. This is modeled as the convolution of the point spread function with the data given in FIG. 6, plus additive Gaussian noise to model environmental noise in the data collection process. The standard deviation is about 10% of the signal. Angular displacement is plotted versus relative position of the object to the imager.
Figure 8:
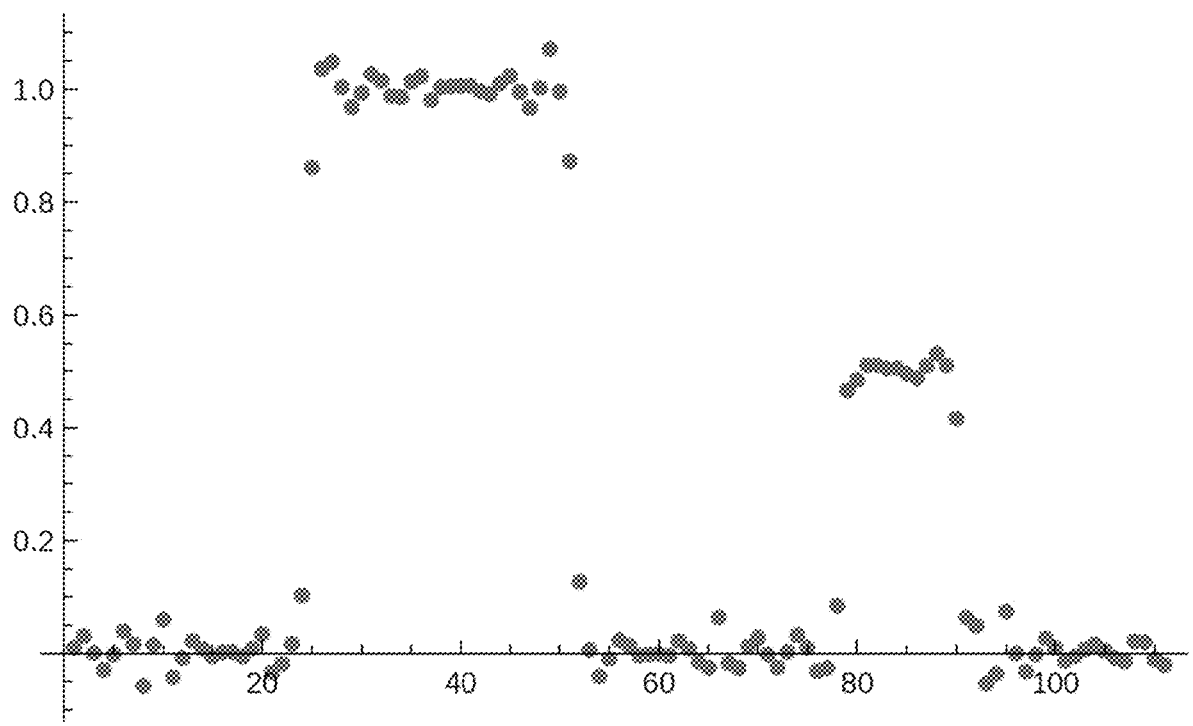
FIG. 8: Result of the deconvolution algorithm to reconstruct the original mass distribution.

An example of a 1-D mass distribution is shown in FIG. 6, which shows two step square functions of differing spatial extent and amplitude. FIG. 7 shows the predicted static equilibrium of the pendulum as a function of the position of the mass relative to the pendulum. The net displacement signal is shown with 10% Gaussian noise. Using a Wiener filter and a total variation reconstruction, FIG. 8 shows the reconstructed image.

Generalization to Two and Three Dimensions

Suppose that a 2D or 3D object is to be gravitationally image. There will be a mass distribution $\rho(x,y)$ or $\rho(x,y,z)$. One may proceed by assuming the torsion pendulum can rotate only about one axis (the z-axis), and consequently only the z-component of the torque is computed. This is found as:

$$\tau_z = \hat{z} \cdot (\vec{r}_i \times \vec{F}_i), \tag{44}$$

where $\vec{r}_i$ is a vector from the origin to mass $m_i$, and $\vec{F}_i$ is the force vector acting on mass i from the differential mass region at point $(x,y,z)$. The net z-component of the torque is found as, $$\tau_{z,\Sigma} = GmM\ell y \left( \frac{1}{(r'_1)^3} - \frac{1}{(r'_2)^3} \right), \tag{45}$$

where $r'_{1,2} = \sqrt{(x \mp \ell)^2 + y^2 + z^2}$ has been modified. Here, the basic effect of the z direction is seen as contained in the mass distribution itself, and the additional fall off in the denominator the further the mass is from the pendulum. In the y direction, the constant value d now can change as y, as one gets closer and further away from the pendulum. The two dimensional case corresponds to fixing the y variable.

The continuum limit can be reached by introducing a mass density $\rho$, with a net torque of:

$$\tau_{z,\Sigma} = \int dx\,dy\,dz\,\rho(x,y,z) f(x,y,z), \tag{46}$$

where:

$$f(x,y,z) = Gmy\ell \left( \frac{1}{(r'_1)^3} - \frac{1}{(r'_2)^3} \right). \tag{47}$$

In 2D, one only integrates over x and z. The inversion in 2D and 3D works in principle as the 1D case. Focusing here on the 2D case of imaging in a plane, the torque is only mapped out as the mass density is being raster scanned. This gives the torque as a function of the relative coordinates $\tau_{z,\Sigma}(x',z')$. As in the 1D case, this is the same as Eq. (46), with $\rho$ replaced by $\rho(x-x',z-z')$. This is now a two-dimensional convolution. Consequently, $\rho(x,z)$ can be represented with the inverse Fourier transform $\mathcal{F}$, $$\rho(x,z) = \mathcal{F}[\tilde{\tau}_{z,\Sigma}(\vec{k})/\tilde{f}(\vec{k})], \tag{48}$$

where the known function $\tilde{f} = Gm\ell(\tilde{g}(\ell) - \tilde{g}(-\ell))$ is given by the multi-dimensional Fourier transform, $$\tilde{g}(\vec{k}) = \int d^2x\, e^{-i\vec{k}\cdot\vec{x}} \frac{y}{((x-l)^2 + y^2 + z^2)^{3/2}}. \tag{49}$$

Finite Sampling in 3D

In the previous sections, a continuous data curve was assumed as the imaged object was displaced in time. It is likely more realistic to consider a set of data points taken at discrete locations around the object in question. One may consider finite data sets from such an array of measurements at discrete points. For simplicity, consider a uniform grid of object points in three dimensions, $\{x_i, y_i, z_i\}$, where $i=1, \ldots, p$. These points approximate a three dimensional object by shrinking the mass within a lattice unit cell into a point of mass $m_i$. This mass array is sensed with a detector sampling the gravitational field at a series of discrete points $\{x_j^d, y_j^d, z_j^d\}$, with $j=1, \ldots, q$. These points can be taken around the outside of the body that is being imaged, with several detectors, or a single detector that is displaced (or kept stationary, with the body being imaged moved around). Since the gravitational force is proportional to the two attractive masses, and is additive as a vector, a general relation can be derived between the measured quantities $\theta_j$ and the system masses $m_i$, given as a linear relationship, $$\theta = R \cdot M, \tag{50}$$

where $\theta$ is a vector of dimension q with elements $\theta_j$, and M is a vector of dimension p with elements $m_i$. The matrix R is a q×p matrix, which encodes both the geometric relationships between detector and system, as well as the type of detector in use (a free particle, a simple pendulum, a torsion pendulum, etc.). For each of those detectors, the measured quantities may be different (acceleration, displacement, an angle, etc.)

If the dimensions of the system and detector degrees of freedom match, then the matrix has a unique inverse (assuming is has a nonzero determinant). Otherwise, the solution is either over or under determined in general. The Moore-Penrose pseudoinverse, $R^+$ can be used to give the best fit solution to this linear equation, $$M_{bf} = R^+ \cdot \theta, \tag{51}$$

where the pseduo-inverse solution minimizes the norm of all solutions M. The pseduo-inverse may be constructed in a simple way with the singular value decomposition, $R = U\Sigma V^\dagger$, where U,V are unitary matricies, and $\Sigma$ is a diagonal matrix, $$R^+ = V\Sigma^+ U^\dagger. \tag{52}$$

The pseduo-inverse of the diagonal matrix $\Sigma$, denoted as $\Sigma^+$, may be found by inverting the nonzero elements of $\Sigma$ and taking the transpose.

Matrix R is now computed for the special case of a torsion pendulum detector discussed above. Adapting the geometry shown in FIG. 3 to three dimensions, and aligning the torsion pendulum in the y direction, one considers sampling the gravitational field in a plane of constant z. In that case, the net torque about the pendulum axis is $$\tau_{ij} = G\ell m_i m_j \left( \frac{z_j^d - z_i}{[(z_j^d - z_i)^2 + (y_j^d - y_i)^2 + (x_j^d - x_i - l)^2]^{3/2}} - \frac{z_j^d - z_i}{[(z_j^d - z_i)^2 + (y_j^d - y_i)^2 + (x_j^d - x_i - l)^2]^{3/2}} \right). \tag{53}$$

Assuming the masses of the torsion pendulum are the same at every point, and therefore set the masses of the pendulum $m_j = m$ for all j. The net displacement angle of the pendulum located at position i, for a restoring torsion constant $\kappa$, is given by $$\theta_j = \sum_i \tau_{ij}/\kappa = \sum_i R_{ji} m_i, \qquad (54)$$

where the last equality defines the matrix $R_{ji}$.

In order to switch to another imaging plane, the torque given in Eq. (53) can be modified accordingly. For example, to align the pendulum in the z direction, and sample in the plane of constant y, the numerator would involve $y_j^d - y_i$, and the denominator's $\ell$ dependence would be in the y degree of freedom. The matrix $R'_{ji}$ obtained from that plane would then be appended to the matrix $R_{ji}$ from the first measurement plane, to obtain a generally rectangular matrix of all the data.

Once the response matrix R is defined, it is then straightforward to change the mass distribution within the region, and to use the same reconstruction matrix, which will still be valid so long as the geometric relationships between the measurement planes and grid points are the same.

Numerical Examples

The problem to solve is a deconvolution problem: Given a known "point spread function," $f(\vec{x})$, and a measured torque function versus scan coordinate $\vec{x}'$, the mass density profile $\rho(\vec{x})$ is to be reconstructed where there is added white Gaussian noise $\nu$ from the measurement process, $$\tau = f * \rho + \nu \qquad (55)$$

Here * indicates the convolution operation. The simple inverse of the Fourier transform (in the absence of noise) is problematic, since the Fourier transform of the point spread function rapidly goes to zero, so its inverse diverges rapidly, leading to instability in the deconvolution. There exist a suite of deconvolution techniques, the classic one being the Wiener filter, defined as:

$$W(k) = \frac{(\mathcal{F}[f](k))^*}{|\mathcal{F}[f](k)|^2 + 1/\mathcal{R}}. \qquad (56)$$

Here $\mathcal{R}$ is the signal-to-noise ratio of the data collection, which cuts off the divergence in inverting the small values of the transform of $f$. The reconstructed approximation is given by:

$$92_{rc} = \tau * W \qquad (57)$$

Note that because $\mathcal{F}[f](k=0)$, the overall scale of $\rho$ cannot be directly reconstructed, so the inverse is defined only up to an overall factor; that is, $C\delta(k)$ can be added to the Fourier transform, or a constant function to $f(x)$.

One having skill in the art will understand that the Wiener filter is the oldest example in what is now a lengthy number of possible methods to help in the deconvolution problem. The present disclosure should not be limited to the disclosed methods—e.g., the non-limiting, exemplary use of the Wiener filter.

To obtain a 2D scan, the device may be raster scanned or multiple devices may be used. In embodiments where a 3D scan is obtained, multiple detectors can be incorporated to work together.

Resolution of the Imaging System

With respect to the sensitivity of such a detector to fine-grain details of an image, in an optical context, this resolution is limited by the Rayleigh Criterion. However, in the gravitational case, there is no known "wavelength," so in principle there is no limit to the resolution within Newtonian gravity.

Figure 9:
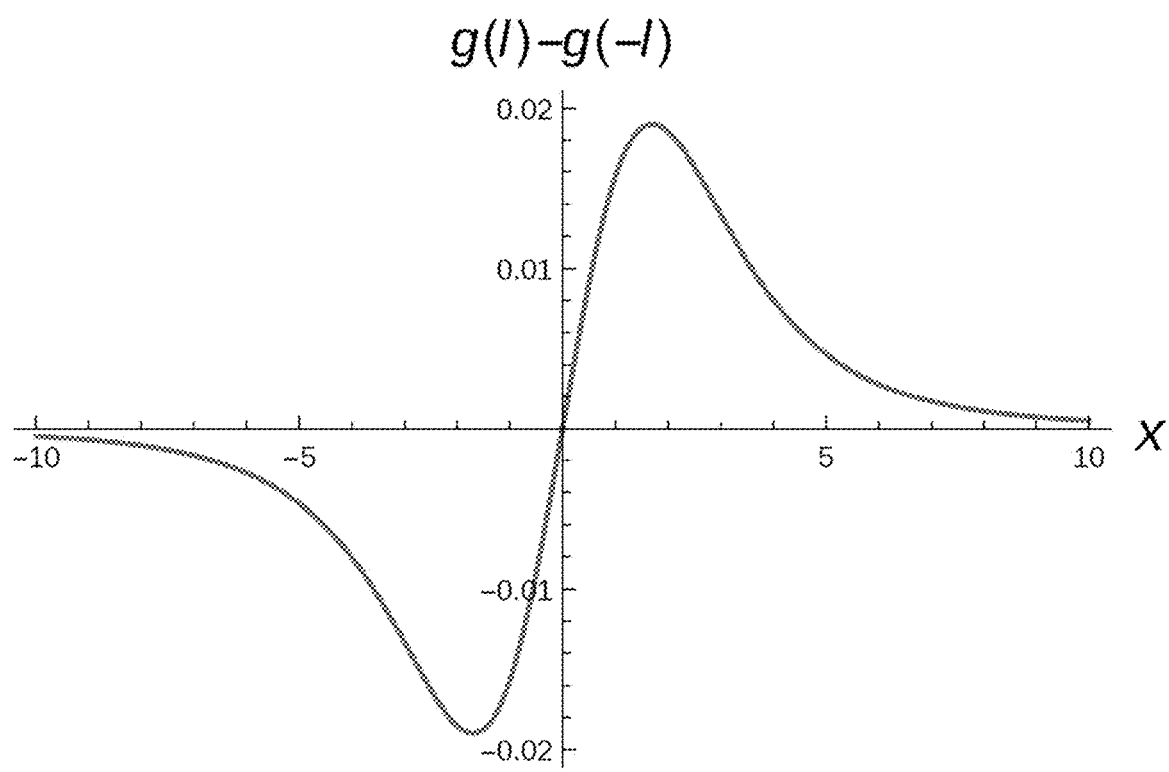
FIG. 9: The net torque of a point mass is proportional to $g(\ell,x)-g(-\ell,x)$, which is plotted here versus x. This is also called the "point spread function" in Fourier imaging techniques. Note it is an odd function, and most sensitive at x=0.
Figure 10:
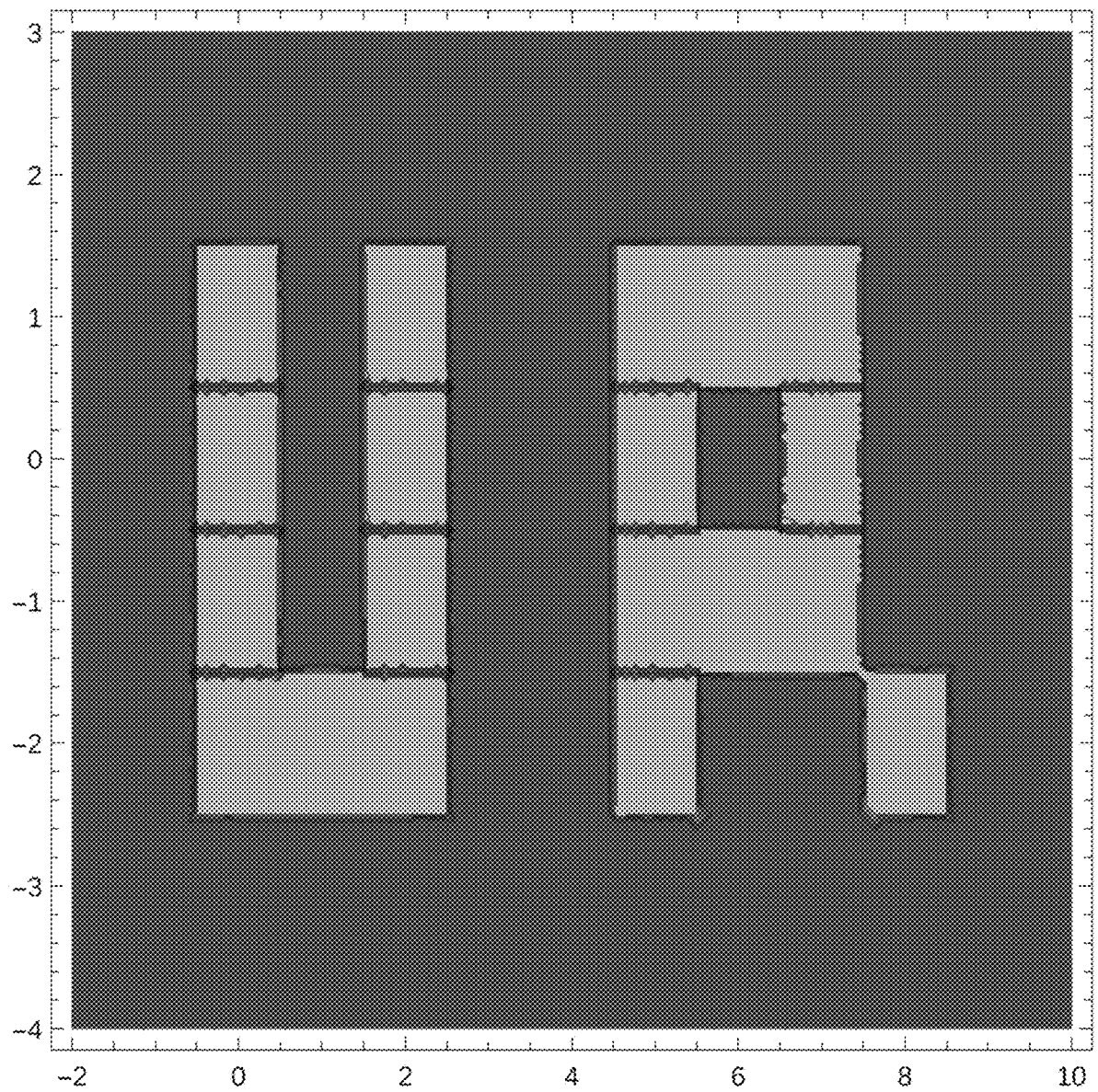
FIG. 10: Sample of a two dimensional image, given here as a piece-wise constant function giving the letters "U R."
Figure 11:
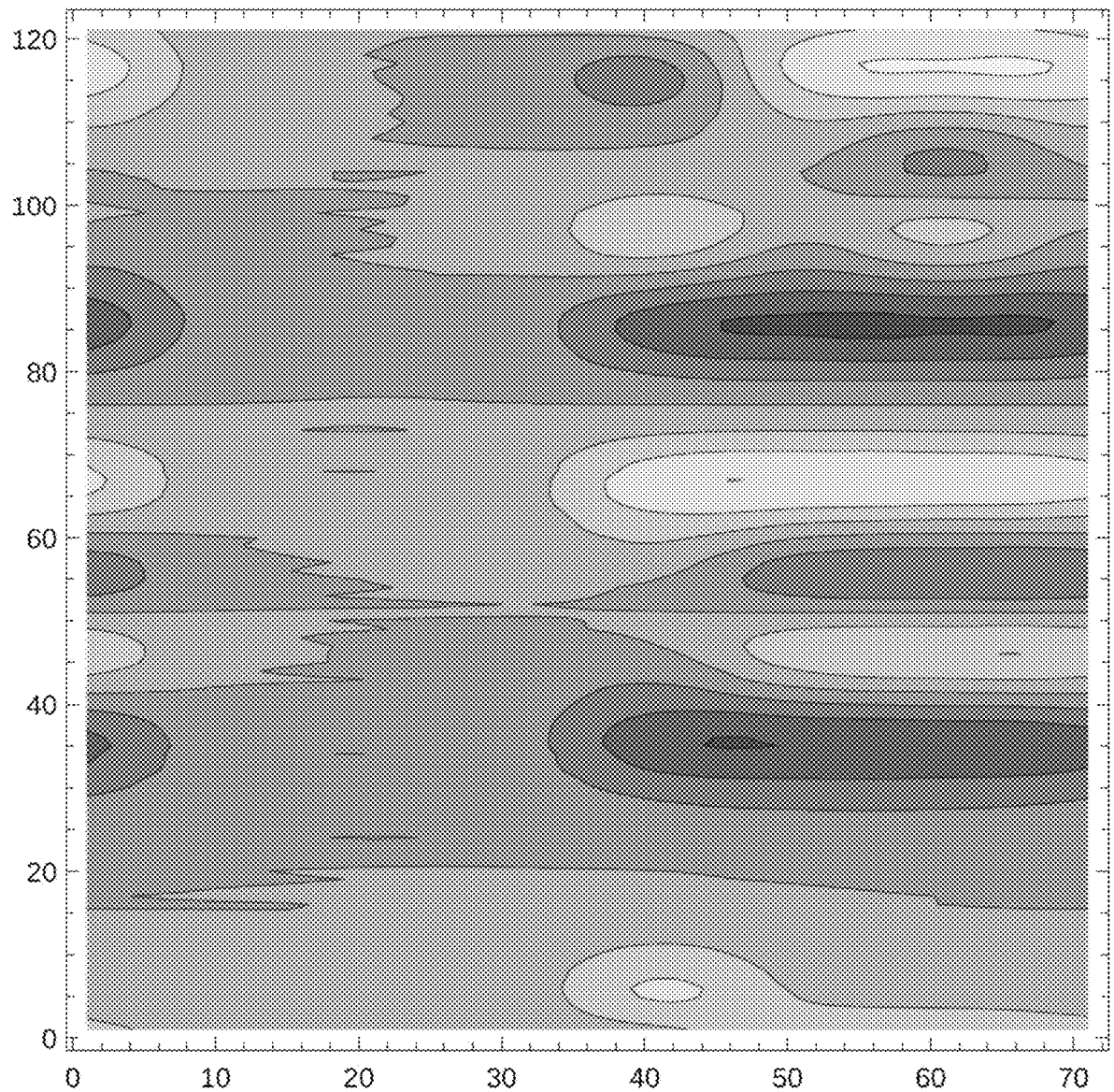
FIG. 11: The signal is given proportional to the net displacement angle as the detector is scanned over the imaged distribution. This is modeled as the convolution of the 2D point spread function with the data given in FIG. 10, plus additive Gaussian noise to model environmental noise in the data collection process. The standard deviation is about 10% of the signal.
Figure 12:
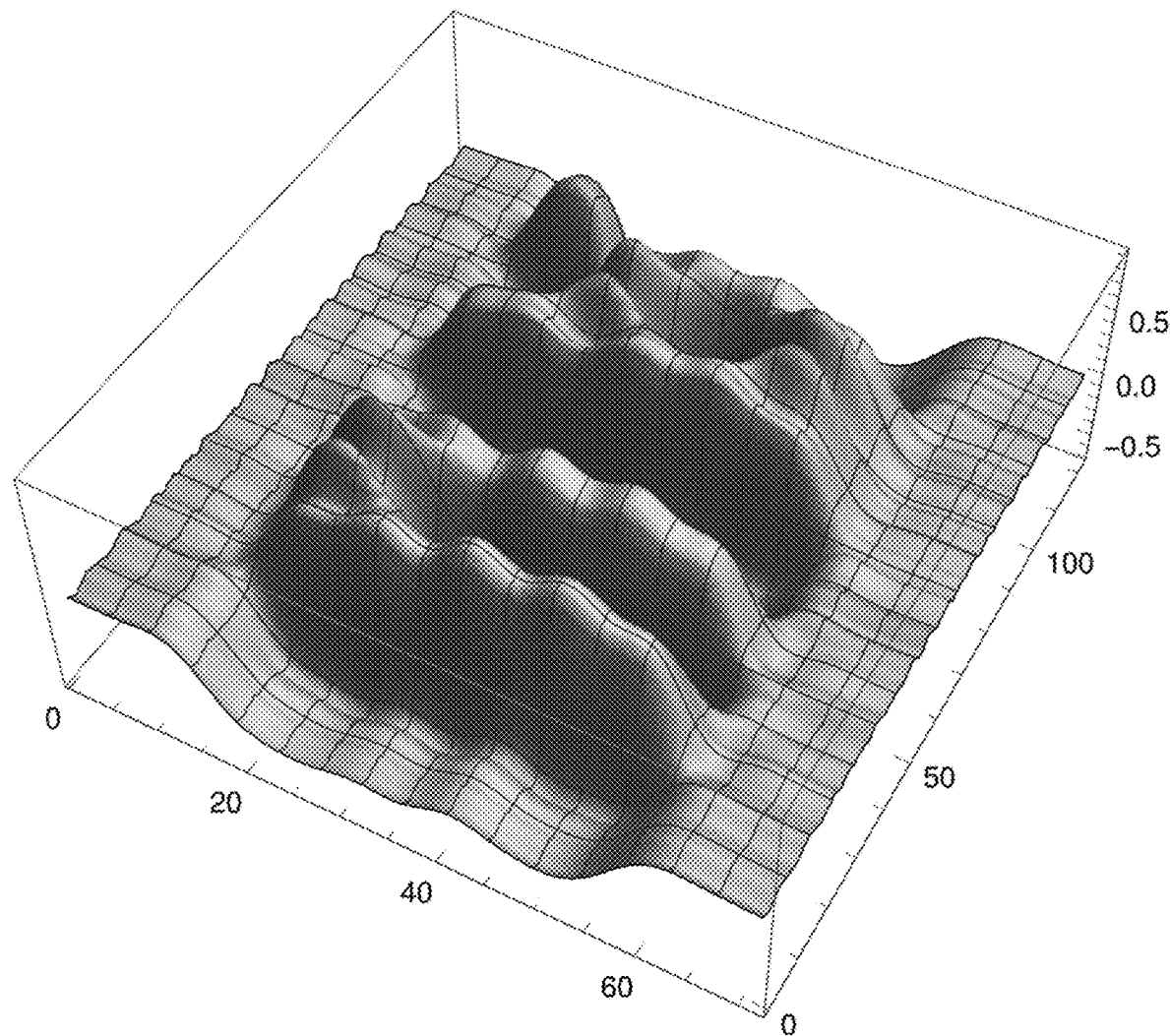
FIG. 12: Result of the deconvolution algorithm to reconstruct the original 2D mass distribution. Note the algorithm has reflected the image, which can be reversed by an appropriate transformation.

In practice, however, there will be limit set by how precisely the detector can measure the angle shift of the torsion pendulum. Consider $\Delta\theta$ as the standard deviation of the measured angle. As can be seen from FIG. 9, the response of the torsion pendulum is most sensitive at x=0. The position resolution of the detector can be estimated by finding the standard deviation $\Delta x$ corresponding to the angular uncertainty. Physically, this corresponds to the ability to resolve when a point mass is shifted by a small amount $\Delta x$ in space.

The resolution $\Delta x$ may be found by error propagation, $$\Delta x = \left|\frac{\partial \theta(x)}{\partial x}\right|^{-1} \Delta\theta, \qquad (58)$$

where one considers when the slope of $\theta$ is steepest with respect to x—i.e., x=0.

The equilibrium angle for a point mass M is given by $\theta(x, \ell, y) = C(g(x,y,\ell) - g(x,y,31\ \ell))$, where $C = \ell \gamma GmM/\kappa$. The slope of the function at the origin $S_0$ is computed, $$S_0 = \left.\frac{\partial \theta}{\partial x}\right|_{x=0} = \frac{6C\ell}{(\ell^2 + y^2)^{5/2}} = \frac{6GmM}{\kappa} \frac{y\ell^2}{(\ell^2 + y^2)^{5/2}}. \qquad (59)$$

In order to made the uncertainty on $\Delta x$ as small as possible, the slope $S_0$ is to be as large as possible. Therefore, $S_0$ versus $\ell$ is maximized, keeping y fixed. The maximal slope is found to be when $\ell = \sqrt{2/3}y \approx 0.8615y$, or $y \approx 1.22\ell$, which corresponds to $$S_{0,max} \approx \frac{1.115 GmM}{\kappa y^2} \qquad (60)$$

where again, y is assumed to be fixed.

Estimating the position uncertainty $\delta x$, m and M are assumed to be about 1 kg, and the precision with which the object can be located is considered. Using the same torsion constant as before, $\kappa$ of $10^{-3}$ Nm/rad, let y=1 m and $G \approx 6 \times 10^{-11}$ Nm$^2$/(kg)$_2$. For the angular uncertainty, a value found in previous work was used, $\Delta\theta = 400$ frad $= 4 \times 10^{-13}$ rad. Putting this all together, for a 1 kg mass at 1 meter, $$\Delta x \approx 6 \ \mu m, \qquad (61)$$

which shows very good results. If the test mass is reduced to a mass of 1 mg, the resolution decreases by three orders of magnitude to about 6 mm, which is still good.

Torsion Pendulum Rod Embodiment

Considering another geometry where there is just a rod pendulum of mass m and length L. A point mass is considered, located at perpendicular position y from the rod, and lateral position x from the center of mass of the rod.

Integrating the net torque produced by a mass element dm over the length of the rod, the torque is found as, $$\tau_\Sigma = \frac{GMmy}{L}\left(\frac{Lx/(2y^2) - x^2/y^2 - 1}{\sqrt{(L/2-x)^2 + y^2}} + \frac{Lx/2 + x^2/y^2 + 1}{\sqrt{(L/2+x)^2 + y^2}}\right) \qquad (62)$$

The moment of inertia is $I=(1/12)mL^2$. It is noted that this moment of inertia of the bar is down by a factor of ⅓ compared to the dumbell (two masses interconnected by a rigid rod) of the same length and total mass (m→2 m, L→2 $\ell$). This gives the period T since $\tau_\Sigma = i\alpha$ is of the pendulum. Here, the torsion constant $\kappa$ is expressed, in terms of T, as:

$$\kappa = \frac{\pi^2 mL^2}{3T^2}. \quad (63)$$

This gives the angle $\theta = \tau_{\Sigma/\kappa}$.

The function Eq. (62), divided by $\kappa$, is the new "point spread function" for imaging a mass distribution with the rod imaging system.

Exemplary Methods

In an embodiment, a method of scanning an object includes determining a first displacement of a pendulum caused by the object. The displacement may be determined using a Sagnac inferometer as described herein. The object is moved with respect to the pendulum. For example, either of the object or the pendulum can be moved, or both can be moved. A second displacement of the pendulum (i.e., displacement of the pendulum caused by the object) is measured. A profile of the object is determined. The profile may include, for example, a position (such as, for example, a 1D position), a mass, and/or a mass distribution (e.g., gravimetric density profile). As described above, additional measurements of the pendulum displacement may be made while the object is in various locations.

In another embodiment, a method of scanning an object comprises providing a pendulum gravimeter. The pendulum gravimeter may be of any variety described herein. For example, in an embodiment, the pendulum gravimeter has a pendulum with a mirror. The pendulum is configured to have a restoring force, for restoring the pendulum to a neutral position. The pendulum gravimeter may further include an interferometer, such as, for example, a Sagnac interferometer. The interferometer is configured to measure a displacement of the pendulum from the neutral position. The method includes measuring the gravitational field of the object at a first measurement location and measuring the gravitational field of the object at a second measurement location. Measuring the gravitational field may include measuring a displacement of the pendulum from the neutral position, and determining the gravitational field based on the measured displacement. The mass distribution of the object is calculated based on the measured gravitational fields. The mass distribution of the object may be calculated in any way described herein.

For example, the object may be measured at a plurality of additional measurement locations for a total of q measurement locations. The object may be scanned in three dimensions and the measured gravitational field of the object $\theta$ is represented by a matrix of the measurements $\theta_j$ at each measurement location j having coordinates $\{x_j^d, y_j^d, z_j^d\}$, where j=1, ..., q and q is the total number of data points. The mass distribution of the object M may be determined as a matrix of point masses $m_i$ over a set of grid points $\{x_i, y_i, z_i\}$, where i=1, ..., p and p is the total number of grid points. The mass distribution M of the object may be determined according to $M = R^+ \cdot \theta$, where $R^+$ is the pseudo-inverse of a predetermined scanner matrix R.

The calculated mass distribution may be used to create, for example, an image of the object. In such a case, scanning the object may be considered as imaging the object, and the gravimeter may be considered to be a "gravimetric camera."

In some embodiments, the object is measured at the second measurement location using a second pendulum gravimeter. In some embodiments, the object is measured at the second measurement location by moving the pendulum gravimeter (e.g., moving the gravimeter and subsequently obtaining the measurement). In some embodiments, the object is measured at the second measurement location by moving the object with respect to the pendulum gravimeter (e.g., moving the object and obtaining the reading when the gravimeter is at the second measurement location with respect to the object).

Although the present disclosure has been described with respect to one or more particular embodiments, it will be understood that other embodiments of the present disclosure may be made without departing from the spirit and scope of the present disclosure.

We claim:

1. A method of scanning an object, comprising:
    providing a pendulum gravimeter comprising:
        a pendulum having a mirror, the pendulum configured to have a restoring force for restoring the pendulum to a neutral position; and
        an interferometer configured to measure a displacement of the pendulum from the neutral position;
    measuring the gravitational field of the object at a first measurement location;
    measuring the gravitational field of the object at a second measurement location; and
    calculating the mass distribution of the object based on the measured gravitational fields.

2. The method of claim 1, wherein measuring the gravitational field comprises:
    measuring a displacement of the pendulum from the neutral position; and
    determining the gravitational field based on the measured displacement.

3. The method of claim 1, wherein the object is measured at the second measurement location using a second pendulum gravimeter.

4. The method of claim 1, wherein the object is measured at the second measurement location by moving the pendulum gravimeter to the second measurement location.

5. The method of claim 1, wherein the object is measured at the second measurement location by moving the object with respect to the pendulum gravimeter such that the pendulum gravimeter is at the second measurement location.

6. The method of claim 1, wherein the object is scanned in one dimension (1D).

7. The method of claim 1, wherein the object is scanned in two dimensions (2D).

8. The method of claim 1, wherein the object is scanned in three dimensions (3D).

9. The method of claim 1, wherein the object is measured at a plurality of additional measurement locations for a total of q measurement locations.

10. The method of claim 9, wherein the object is scanned in three dimensions and the measured gravitational field of the object $\theta$ is represented by a matrix of the measurements $\theta_j$ at each measurement location j having coordinates $\{x_j^d, y_j^d, z_j^d\}$, where j=1, ..., q and q is the total number of data points; and wherein the mass distribution of the object M is determined as a matrix of point masses $m_i$ over a set of grid points $\{x_i, y_i, z_i\}$, where i=1, ..., p and p is the total number of grid points.

11. The method of claim 10, where the mass distribution M of the object is determined according to $M=R^+ \cdot \theta$, where $R^+$ is the pseudoinverse of a predetermined scanner matrix R.

12. A method of scanning an object, comprising:
- determining, using a Sagnac interferometer, a first displacement of a pendulum caused by the object;
- moving the object with respect to the pendulum;
- measuring a second displacement of the pendulum caused by the object; and
- determining a profile of the object based on the displacement of the pendulum.

* * * * *